United States Patent [19]

Mitsuhashi et al.

[11] Patent Number: 5,048,320

[45] Date of Patent: Sep. 17, 1991

[54] METHOD AND APPARATUS FOR IMPACT-TYPE INSPECTION OF STRUCTURES

[75] Inventors: Kunihiro Mitsuhashi; Chihiro Jyomuta; Fujio Oka, all of Tamano; Hidetoshi Nishikawa, Chiba, all of Japan

[73] Assignee: Mitsui Engineering & Shipbuilding Co., Ltd., Tokyo, Japan

[21] Appl. No.: 423,475

[22] PCT Filed: Feb. 2, 1988

[86] PCT No.: PCT/JP88/00092

§ 371 Date: Nov. 7, 1989

§ 102(e) Date: Nov. 7, 1989

[87] PCT Pub. No.: WO89/07249

PCT Pub. Date: Aug. 10, 1989

[30] Foreign Application Priority Data

Aug. 28, 1986 [JP] Japan .................................. 61-200055
Sep. 17, 1987 [JP] Japan .................................. 62-231032

[51] Int. Cl.[5] .......................... G01N 3/30; G01M 7/00
[52] U.S. Cl. ............................................ 72/12; 73/82
[58] Field of Search .................. 73/12, 82, 573, 581, 73/582, 588

[56] References Cited

U.S. PATENT DOCUMENTS

| | | | |
|---|---|---|---|
| 2,357,856 | 9/1944 | Tate | 73/82 |
| 4,004,450 | 1/1977 | Yakshin et al. | 73/12 |
| 4,195,512 | 4/1980 | Reid, Jr. | 73/82 X |
| 4,289,023 | 9/1981 | Rader | 73/12 X |
| 4,422,320 | 12/1983 | Moorby et al. | 73/12 |
| 4,519,245 | 5/1985 | Evans | 73/588 X |
| 4,534,206 | 8/1985 | Kiso et al. | 73/82 X |
| 4,682,490 | 9/1987 | Adelman et al. | 73/12 |

*Primary Examiner*—Charles A. Ruehl
*Attorney, Agent, or Firm*—Armstrong, Nikaido, Marmelstein, Kubovcik & Murray

[57] ABSTRACT

A method of inspection of structures in which a hammer capable of imparting a non-destructive impact to an object to be inspected and provided with a pressure sensor or an acceleration sensor is hit against the object and, from a signal then put out, a processed signal of the time during which the hammer is in contact with the object or of the waveform signal during such time is displayed, apparatus provided with a signal processing device for the measurement of the above time, and apparatus provided with a device for removing an impact driving force responsive to a signal put out when the hammer contacts the object, for the measurement.

9 Claims, 17 Drawing Sheets

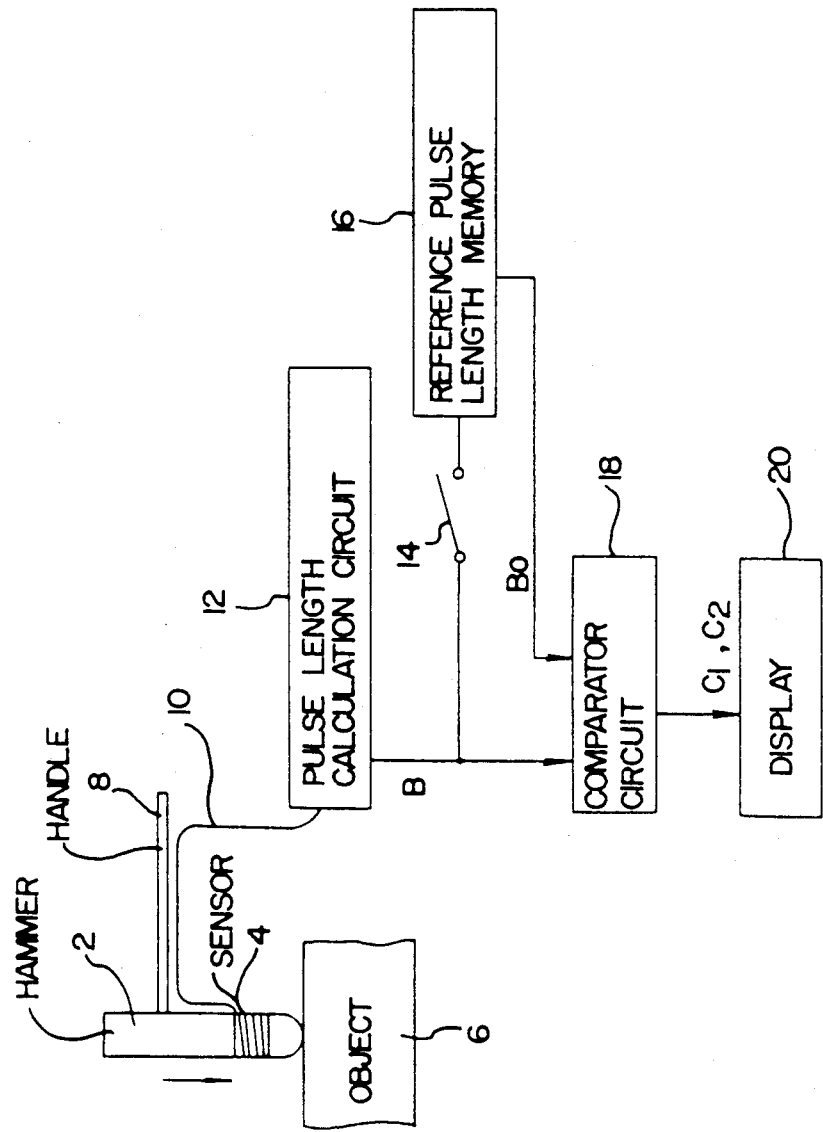

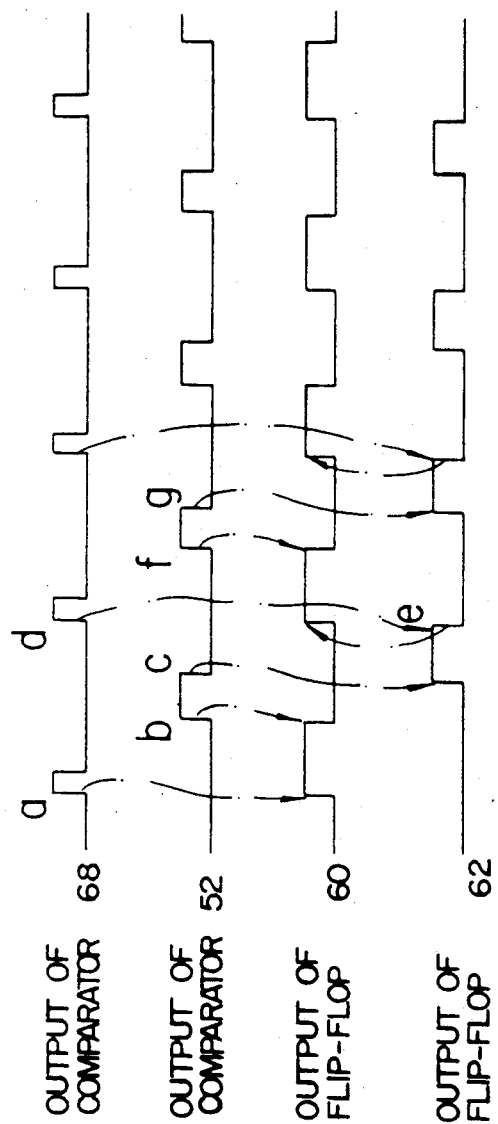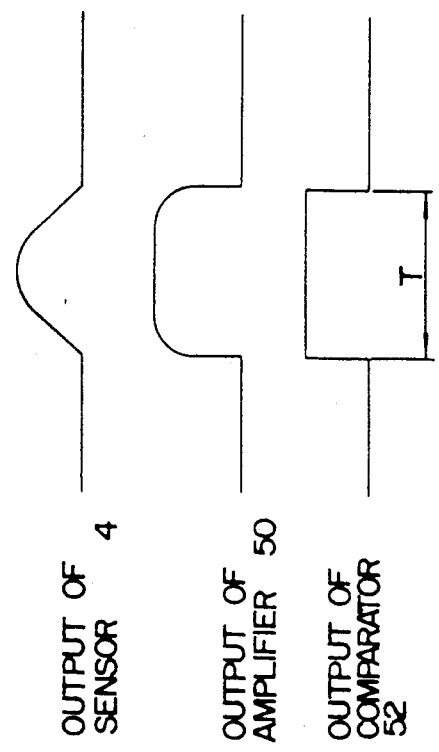

METHOD AND APPARATUS FOR IMPACT-TYPE INSPECTION OF STRUCTURES

DESCRIPTION

1. Technical Field

The present invention relates to a method of and apparatus for inspecting the condition inside a structure or the like to be inspected, by applying an impact by a hammer to a surface portion of the structure or the like.

2. Background of the Invention

It is known that where an object involves a change in its internal structure, for example its thickness is not even or it includes a support or column inside, a change occurs in the sound it produces when its surface portion is hit. This is because, while the object undergoes vibration and produces sounds as it is subjected to impact force applications, the frequency and the waveform of the sound it generates undergo changes in accordance with changes in the rigidity and the density of the object having changes in its internal structure. This phenomenon takes place also where such as a peeled portion and a crack are present inside the object. Thus, it has been practiced in the art to make use of this phenomenon and inspect an internal defect in an object by applying an impact force to the object and examining the sounds then generated.

Generally, such impact-type inspections of objects are carried out by a skilled inspector in a manner such that the inspector applies striking at a variety of points on an object to be inspected, using a small-sized hammer exclusively for striking, such as a one called a test hammer and a one called a coin tap hammer, and the inspector exercising his or her acoustic organ, detects a change in the sounds then generated. Inspection methods of this type are widely relied on in for example the peeling or exfoliation inspection in honeycomb boards or plates, the peeling inspection of tiles, the crack generation inspection in concrete-placed objects or in various materials, the float inspection of decorative cement mortar on surfaces of concrete bodies, the locational detection of pillars, ribs, cores or the like present internal to or behind for example wall plates.

However, the above conventionally known impact-type inspection methods involve various shortcomings and difficulties such as (1) structural defects cannot or can hardly be detected unless the inspection is done by a skilled inspector; (2) in carrying out the inspection over a broad area, it becomes increasingly difficult to effect the detection of defects as the inspection is continued increasingly for a long period of time and as the inspector's nerves then become increasingly fatigued; (3) where an abnormal part is present relatively distant from a normal part in an object to be inspected, it tends to occur that the inspector cannot keep in memory a sound which the inspector has previously detected, when the inspector can no longer make the required judgment; (4) where an object to be inspected is located in a dangerous place and is not accessible, it is not feasible to conduct the inspection: (5) the inspection operation cannot be automated; and (6) the inspection cannot be carried out at noisy sites or places.

Then, it has already been devised in the art to mechanize those inspections which previously relied on manual operations, and there have been proposed impact-type inspection apparatus in which a hammer is mechanically driven, sounds generated from an object to be inspected are converted to electric signals by a microphone and subjected to a frequency analysis, and judgment of timbres is made by means of a speech recognition method to effect the inspection of abnormalities in the object.

As can be readily perceived from the foregoing, the conventional impact-type inspection apparatus are designed to effect discrimination between a normal part and an abnormal part in an object by a frequency analysis or a judgment of timbres relying on a speech or sound recognition means, so that the inspection operations have to be complex and, in addition, it is required to alter the standard or criterion for the judgment in carrying out inspections of different objects. Thus, there exists a demand for improving the known inspection methods and apparatus.

SUMMARY OF THE INVENTION

It is an object of the present invention to provide a method of inspecting the condition of a structure by colliding a hammer provided with a sensor capable of detecting a change in the reaction force the hammer receives from the structure as it is hit against the structure, and effecting the inspection based on signals put out from the sensor.

It also is an object of the invention to provide apparatus for carrying out the method, by which the intended inspection is effected by colliding the hammer against a structure to be inspected by an automatic hammer driving means.

The impact-type structure inspection method for attaining the above objects according to the present invention is characterized by hitting an objective or a candidate structure for the inspection with a hammer which can apply a non-destructive impact force against the structure and which is equipped with a force detecting sensor or an acceleration detecting sensor, and displaying either a characteristic in the waveform of signals produced during the contact of the hammer with the structure or the result of an abnormality judgment made based on the waveform characteristic.

Characteristics which may be displayed include such as the length of time between the hammer is contacted with an object to be inspected and it leaves the object; a waveform which may be displayed in close proximity to a reference waveform serving as judgment standard or criterion; two portions of the above length of time, one up to and the other after a peak in the waveform taken of the length of time; the rise angle and the fall angle in the above waveform; the two portions in the waveform area divided at the peak value; values of functions having the values of the above various characteristics as factors; and the result of comparison of the above functional values with reference values.

Objects and structures for inspection according to the present invention are for example such as bridges, other structural matters assembled and fastened by bolts, rivets or the like, honeycomb structural bodies, structural matters comprising concrete-placed members or the like, structures comprising a concrete-made body having a decorative surface layer of cement mortar, building-type structures comprising for example wood frames applied on surfaces thereof with wall panels made of for example gypsum boards.

Points or items of which the inspection can be made according to the present invention are, in the cases of the above exemplified structures, such as the condition of fastening by bolts, structural defects such as floating of surface panels in honeycomb structures, the generation of cracks in concrete-made bodies, floating of cement mortar layer, locational detection of wood frames supporting wall panels and so forth.

BRIEF DESCRIPTION OF THE DRAWINGS

FIG. 1 is a schematic view, showing an impact-type structure inspection apparatus utilizing a manually operated hammer, according to a first embodiment of the present invention;

FIG. 3-B is a view, showing the instance in which a bolt-fastened structure is inspected using the apparatus of FIG. 1;

FIG. 3-C is a view, showing the instance in which a concrete-placed structure is inspected using the apparatus of FIG. 1;

FIG. 3-D is a view, showing the instance in which an inspection using the apparatus of FIG. 1 is made of a structure in which a wall surface is formed on joists or like supports;

FIGS. 10-A to 10-D show a timing chart, taken for an illustration of the operation in the case of the second embodiment;

FIGS. 11-A to 11-C are views for an illustration of procedures for modulation of a waveform;

DETAILED DESCRIPTION OF THE PREFERRED EMBODIMENT

Figure 2E:
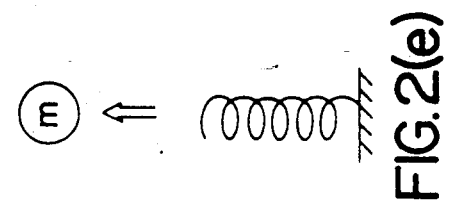
FIGS. 2(a) to 2(e) illustrate the principle of the determination made with use of the apparatus of FIG. 1.
Figure 2D:
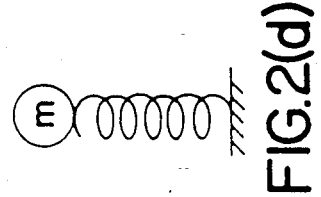
Figure 2C:
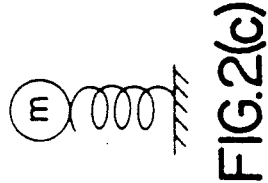
Figure 2B:
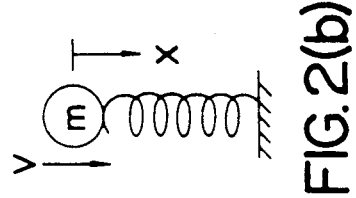
Figure 2A:
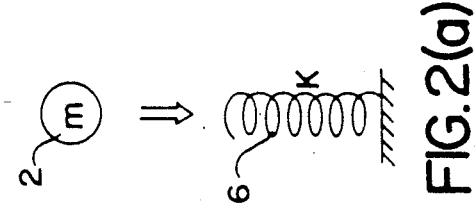
Figure 3A:
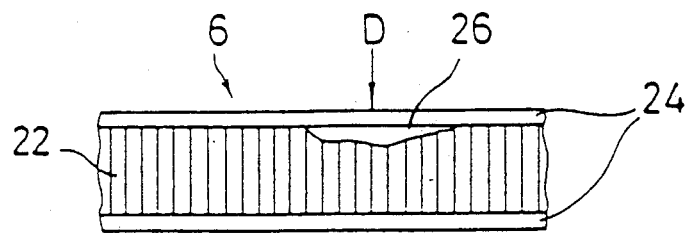
FIG. 3-A is a view, showing the instance in which a honeycomb structure is inspected using the apparatus of FIG. 1.
Figure 3B:
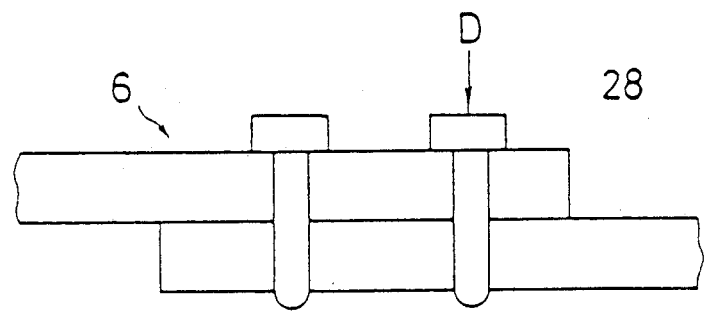
Figure 3C:
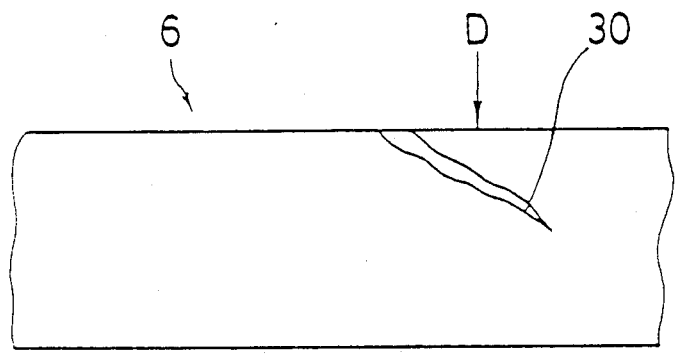
Figure 3D:
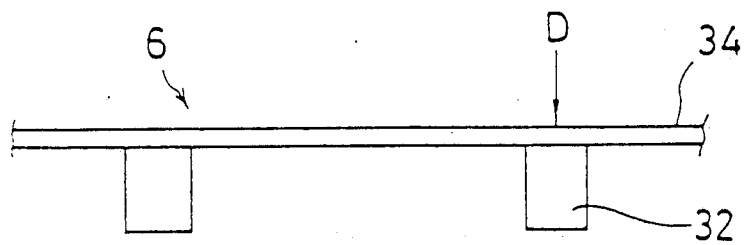

For the sensor to be mounted on a hammer according to the present invention, useful are such as piezoelectric sensors, accelerometers and strain gauges. A piezoelectric sensor or a strain gauge is preferably mounted at a front end portion of the hammer, while an accelerometer is preferably attached at a rear end portion of the hammer, but the above is not limitative.

Where the hitting or striking and the determination or measurement can be continuously operated using an automatic driving device as later to be described, for example as in carrying out the intended inspection over a broad area on for example a building, it is possible to parallel arrange a plurality of inspection apparatus and operate the inspection with the inspection apparatus moved simultaneously.

FIG. 1 is a schematic view, showing a structure of an inspection apparatus utilizing a hand operable hammer. As illustrated, the apparatus includes a hammer 2 for striking or hitting, which is provided with a force detecting sensor 4 or an acceleration detecting sensor, of which while the force detecting sensor 4 is preferably equipped close to the front or leading end of the hammer 2, the acceleration detecting sensor may be disposed on any portion of the hammer.

Further, the hammer 2 may comprise either an automatic hammer which can automatically apply impact forces to an object 6 to be inspected or a hand operable hammer. In FIG. 1, the reference numeral 8 denotes a handle of the hammer and the numeral 10 represents a lead wire for detection signals.

Electric signals of a pulse waveform detected by the force detecting sensor 4 are introduced in the first place into a pulse length calculation circuit 12 and thereby converted into voltages proportional to the pulse lengths, shown by B values, or into digital signals.

Initially, a B value detected at the time when the hammer 2 strikes a normal part in a structure may be kept in memory in a reference pulse length memory 16 by operating a switch 14 to issue a necessary direction. This memorized reference value may be referred to as $B_0$.

In conducting the intended inspection, then, the value B determined of the signals of the pulse length and the reference value $B_0$ are introduced into a comparator circuit 18, and the difference $C_1$ between the two values, namely $C_1 = B - B_0$, a ratio $C_2$ of B to $B_0$, namely $C_2 = B/B_0$, or a ratio $C_3$ of $B - B_0$ to $B_0$, namely $C_3 = (B - B_0)/B_0$ is calculated.

Any of the above values $C_1$, $C_2$ and $C_3$ may be put into a display device 20, and changes from a normal value are made perceivable by any of the emission of light or sound and the display of any of numerical values, letters any symbols.

The inspection of an object to be inspected, namely the judgment as to whether the object involves an abnormality, according to the present embodiment having the above described features, can be carried out by detecting and determining the contact time of the hammer head with the object. This possibility is realizable for the following reasons ascertained by the inventors of the present invention.

Assuming that the mass of the hammer 2 for imparting impact forces to the object to be inspected 6 is m and that the object 6 rebounding the hammer 2 comprises a spring having a spring constant K, the behavior of the hammer 2 during the time when the hammer 2 commences contact with the object 6 and then leaves the object 6 can be illustrated by modelling as in FIGS. 2(a) to 2(e). If the displacement of the hammer 2 after it contacted the object 6 is x, then the equation of motion of the hammer is:

$$m \frac{d^2x}{dt^2} + Kx = 0 \qquad (1)$$

wherein t is the time and d a differential operation.

If at the time when x=0 and t=0, that is to say, at the moment the hammer contacts the object, the velocity of the hammer is V, then:

$$x = (V/\omega_0) \sin \omega_0 t \qquad (2)$$

wherein $\omega_0 = \sqrt{K/m}$.

Thus, the force F acting on the hammer is:

$$F = Kx = (KV/\omega_0) \sin \omega_0 t. \qquad (3)$$

Also, the acceleration of the hammer, $$A = \frac{d^2x}{dt^2},$$

comes to be $$A = -V\omega_0 \sin \omega_0 t \qquad (4)$$

On the other hand, the time T during which the hammer keeps contact with the object is the time during which the hammer moves the distance of the displacement x and returns to the original position, and from the above equation (2) at the time when x=0, it is shown by:

$$T = \pi/\omega_0 = \pi \sqrt{m/K} \qquad (5)$$

wherein $\pi$ is the ratio of the circumference of a circle to its diameter.

Thus, the time of the contact together of the hammer and the object is variable depending on the mass of the hammer and the spring constant K of the object. That is to say, if the mass of the hammer is constant, then the contact time T of the hammer with the object depends on the spring constant of the object, and if the object involves a defect or an abnormality, the spring constant at the location of the defect or abnormality will show a change, it is possible to find whether the object involves a defect or an abnormality by detecting or measuring the contact time T of the hammer and the object.

It is obvious that while the force F shown by the above equation (3) and the acceleration A shown by the equation (4) have finite values during the contact time T, they become 0 when the hammer and the object are parted from each other.

Therefore, by measuring the contact time T with reference to the waveform of the electric signals from the force detecting sensor or the acceleration detecting sensor, it is possible to determine the spring constant K of the object to be inspected 6 from the above equation (5).

Now, descriptions will be entered into the operation of the impact-type structure inspection apparatus according to the present example 1, in connection with various candidate objects, namely objects to be inspected. When the honeycomb plate or board shown in FIG. 3-A, which comprises a honeycomb core 22 and surface plates 24, is hit at the point shown by an arrow D, this object for inspection 6 shows a lower spring constant K at the peeled portion shown by 26 than at the other normal portions. In the bolt-fastened portion shown by 28 in FIG. 3-B, the spring constant will be small where a slack exists. In the case of the concrete-placed structure shown in FIG. 3-C, the spring constant is low in the vicinity of the surface crack shown by 30. Further, in the case of the structure shown in FIG. 3-D, which has a wall surface 34 supported by joists or like supports 32, the spring constant is high at the location of the joists or like supports 32. As stated above, where a structural change is present in the object 6, the contact time T shows a change in comparison to a normal portion in the object 6. Therefore, by comparing the detected length of the contact time T with the length of a reference time $T_0$, it is possible to display on a display device the result of a judgment made concerning whether or not a defect is present in structures as described above.

Figures 4A, 4B:
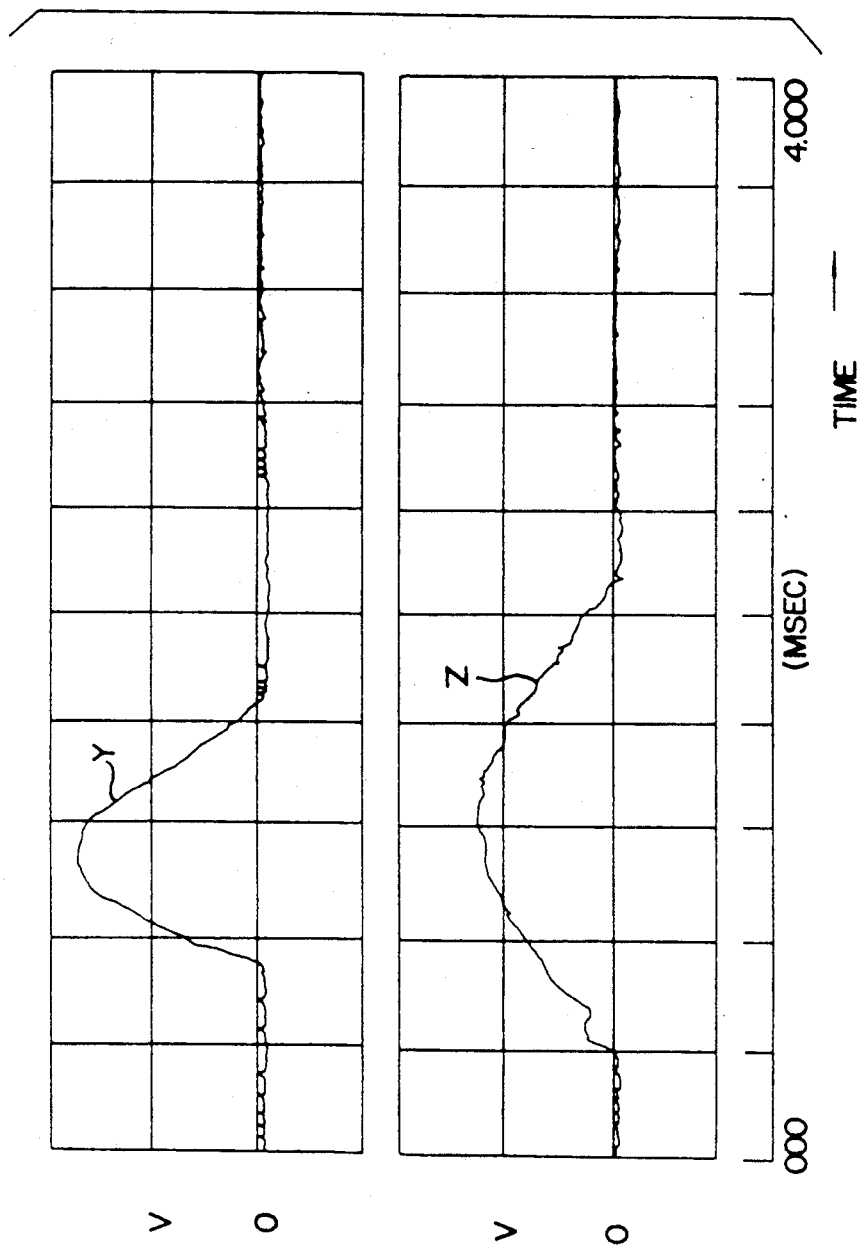
FIGS. 4-A and 4-B show waveform charts obtained as a result of the inspection illustrated in FIG. 3-A.

Using a honeycomb board having a paper core of a height of 12 mm and 0.8 mm thick aluminium plates on both surfaces and having a $\phi$45 mm peeled portion for the object to be inspected 6, this board was subjected to an impact force application by a hammer 2 weighing 140 g, when there were detected the pulse waveform of force F shown by the curve Y in FIG. 4A at the peeled portion in the board and the pulse waveform shown by the curve Z in FIG. 4B at a normal portion of the board. As can be seen, between the two curves Y and Z there is such a difference as nearly to be two times, and this difference is clearly shown by the apparatus shown in FIG. 1.

Figure 5:
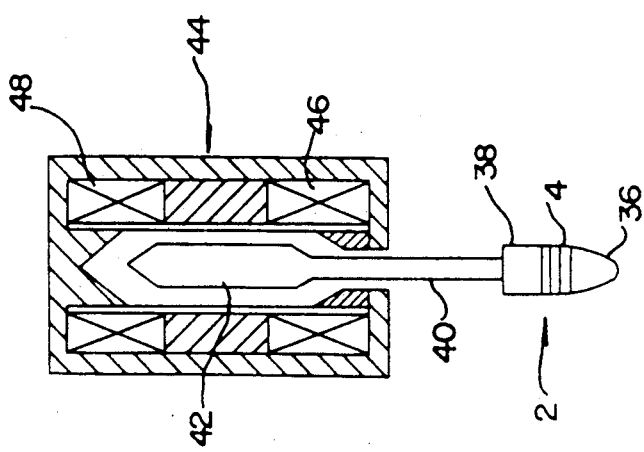
FIG. 5 shows a sectional view of a hammer driving part, representing a second embodiment.

Now, with reference to FIGS. 5 to 11C, a description will be given to a second example in which the inspection was made by a portable automatic control apparatus. FIG. 5 is a sectional view, showing the hammer driving part used in the present example 2, in which the hammer 2 has a hammer head 36 having an almost conical configuration, a force detecting sensor 4 and a weight 38, which altogether are made integral by for example bonding. Also, an actuation rod 40 is connected to the weight 38, and an upper end portion of the rod 40 has a plunger 42 made of a mild steel and housed in a casing of the hammer driving part 44, which comprises a striking coil 46 for driving the hammer 2 towards the object for inspection through the plunger 42 and a return coil 48 for returning the hammer 2 away from the object for inspection.

Figure 6:
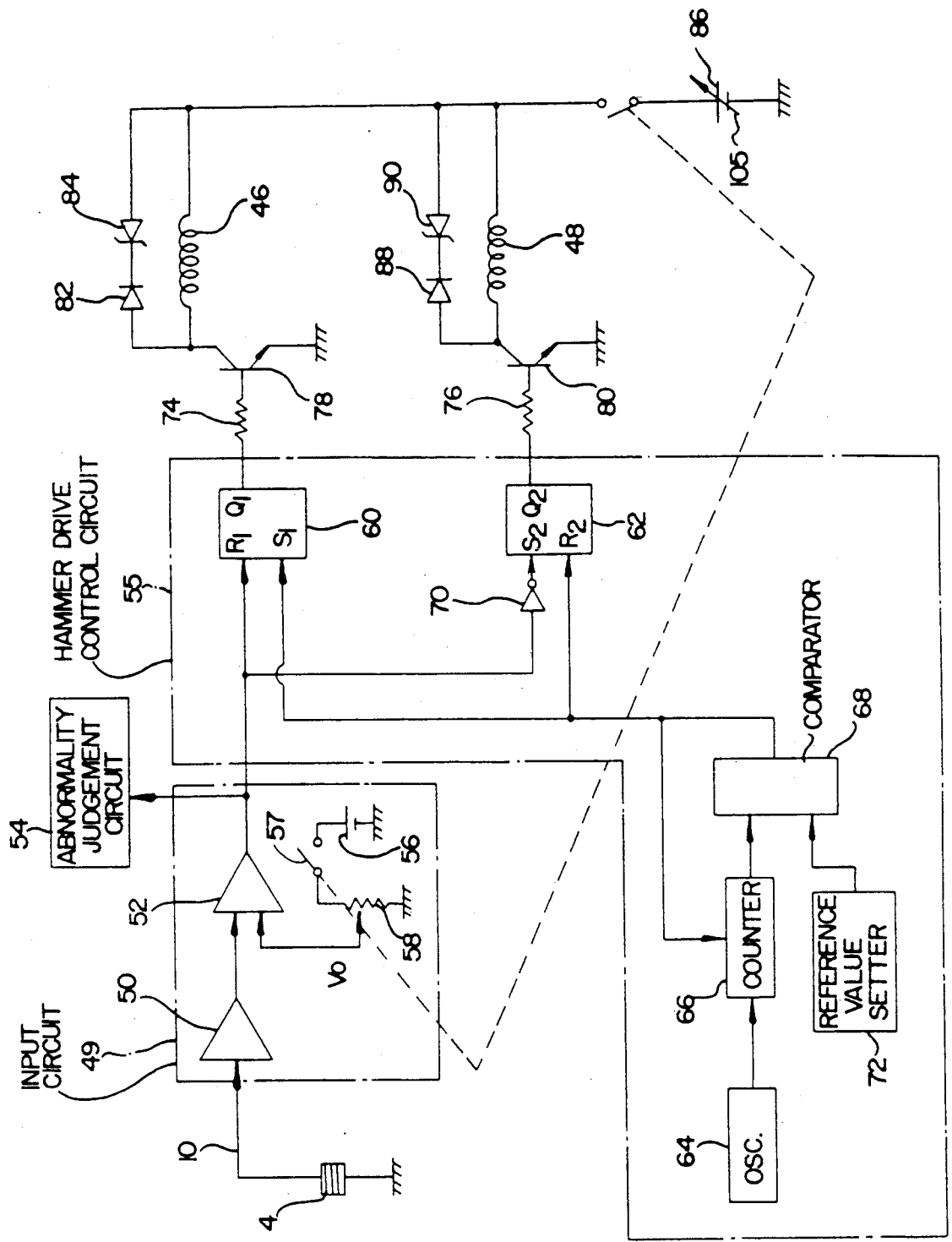
FIG. 6 shows a block diagram of a control circuit for the hammer driving part shown in FIG. 5.

The force detecting sensor 4 comprises a piezoelectric element, detects contact of the hammer head 36 with the object to be inspected and sends a detection signal to a control part. In greater detail, when the hammer head 36 contacts the object that is not shown, a voltage corresponding to the reaction force of the object is generated at an electrode (not shown) of the force detecting sensor 4, this voltage being fed to a control part shown in FIG. 6 via a lead wire 10 (FIG. 6).

The above voltage generated in the force detecting sensor 4 is put into a comparator 52 through an amplifier 50 in an input circuit 49, subjected to a waveform modulation and then put into an abnormality judgment circuit 54 and a hammer drive control circuit 55. Further, the comparator 52 is fed with a reference voltage $V_0$ by a variable resistance 58 powered from a power source 56 through a switch 57.

The hammer drive control circuit 55 comprises two flip-flops 60 and 62, an oscillator 64, a counter 66 and a comparator 68. The output side of the comparator 52 is connected to a reset terminal $R_1$ of the flip-flop 60 and also to a set terminal $S_2$ of the flip-flop 62 through a NOT circuit 70. Further, the oscillator 64 is connected to the input side of the counter 66, the output from which counter is put into the comparator 68 together with a reference value put out from a reference value setter 72. The output from the comparator 68 is fed as reset signal to the counter 66 and also to the set tereminal $S_1$ of the flip-flop 60 and the reset terminal $R_2$ of the flip-flop 62.

Output terminals $Q_1$ and $Q_2$ respectively of the flip-flops 60 and 62 are connected to the bases of transistors 74 and 76 respectively, through resistors 74 and 76 respectively. Emitters of the transistors 78 and 80 are grounded, and to the collectors of the transistors, the hammer striking coil 46 and a flywheel diode 82 are connected in parallel. The flywheel diode 82 has its anode side connected to the collector of the transistor 78 and its cathode side connected to the cathode of a Zener diode 84. The anode of the Zener diode 84 is connected to an output variable power source 86 together with the hammer striking coil 46.

To the collector of the transistor 80, the return coil 48 and a flywheel diode 88 are parallel connected. The flywheel diode 88 has its anode connected to the collector of the transistor 80 and its cathode connected to the cathode of a Zener diode 90, of which the anode is connected to the power source 86 together with the return coil 48.

Figure 7:
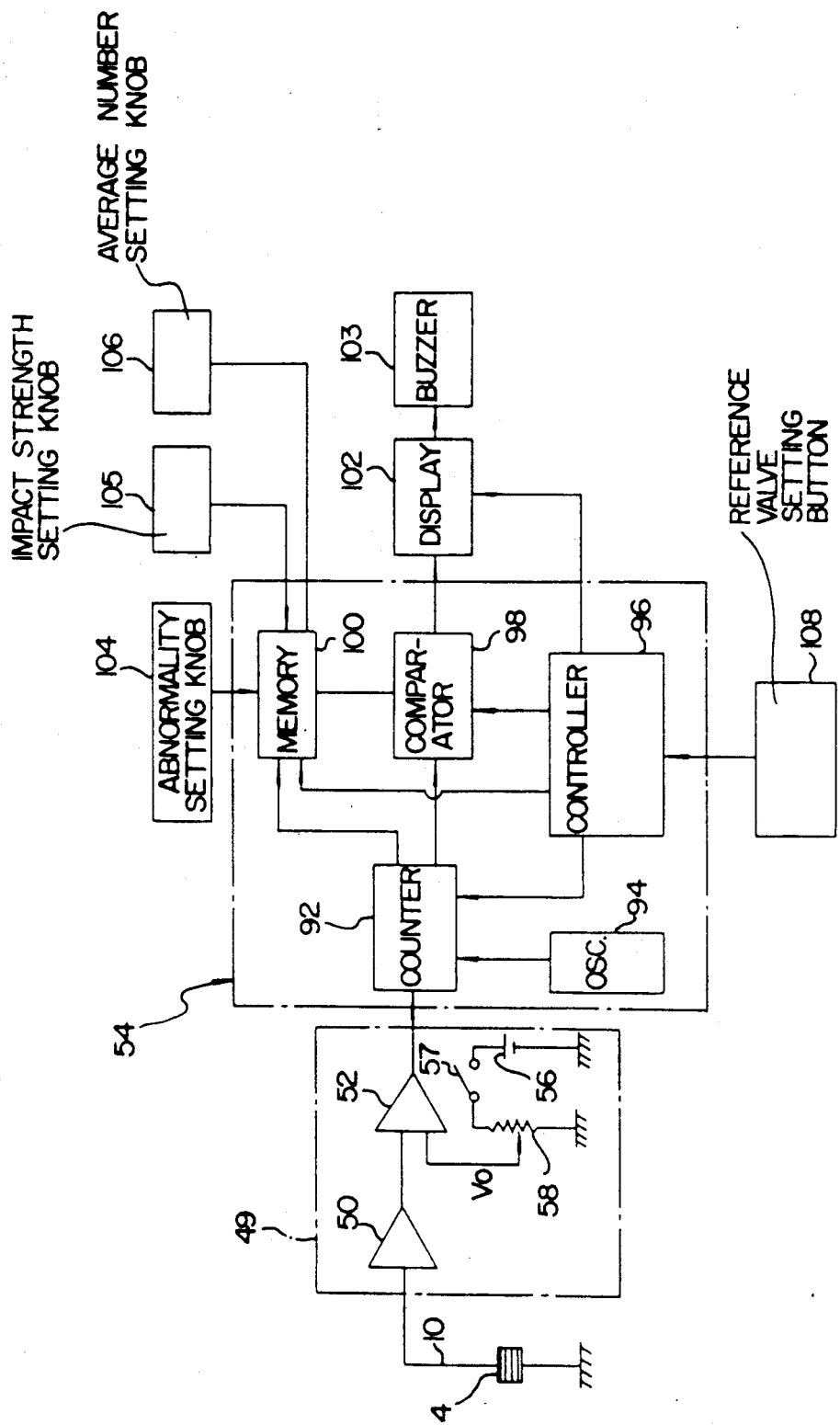
FIG. 7 shows a block diagram of a judgment circuit in the control circuit shown in FIG. 6.

FIG. 7 illustrates an example of the above-mentioned abnormality judgment circuit 54, and this circuit comprises a counter 92, a controller 96, a comparator 98 and a memory 100. The counter 92 receives the output from the comparator 52, pulse signals from the oscillator 94 and control signals from the controller 96. The output from the counter 92 is put into the comparator 98 and the memory 100. The comparator 98 receives a setting direction from the controller 100, takes in the value memorized in the memory 100 as reference value and compares it with the output signals from the counter 92, and feeds the result of the comparison to a display device or part 102 and an abnormality warning buzzer 103 (details in this respect will later be described with reference to FIGS. 7 and 8). In the memory 100, such as an average number to be set by operating an abnormality setting knob 104, an impact strength setting knob 105 and an average number setting knob 106 and a reference value (later to be described) put out from the counter 92 are written by the controller 96. Further, the controller 96 receives a writing direction from a reference value setting button 108 and controls the display device 102 to alter the contents of display corresponding to the size of the output signals from the comparator 98.

Now, a description will be given the details of the display device or part 102 and the abnormality warning buzzer 103 with reference to FIG. 8. The display device 102 comprises light emitting diodes 108G, 108Y, 108r and 108R, and further comprises a switching circuit 109 for controlling each of the above light emitting diodes and the buzzer 103. In greater detail, corresponding to the above light emitting diodes, a plurality (four in the case of the illustrated embodiment) of comparators 110, 111, 112 and 113 are connected parallel with output terminals of the above comparator 98. To the comparators 110 to 113, judgment value setters 114, 115, 116 and 117 are connected, respectively. The comparator 112 comprises a window comparator. In the judgment value setter 115, two judgment values $h_1$ and $h_2$ are set, while in the other judgment value setters 114, 116 and 117, judgment values $h_1$ (for example 10), $h_2$ (for example 20) and $h_3$ (for example 50) are set, respectively.

The output side of each of the comparators 110 to 113 is connected to the base of each of switches 118, 119, 120 and 121 comprising transistors to be connected to the light emitting diodes 108G, 108Y, 108r and 108R by judgment signals issued from the comparator 98, and the comparators operate comparisons with the above judgment values $h_1$, $h_2$ and $h_3$ and put out signals for on-off operation of the switches.

In greater detail, the comparator 98 calculates the largeness (ratio) of the contact time T put out from the counter 92 to the reference value $T_0$ stored in the memory 100 (later to be described) according to the following equation:

$$h = 100 \times (T - T_0)/T_0 \qquad (6)$$

and when $h < h_1$, the comparator 110 puts out "1" (high signal), while when $h_1 < h < h_2$ the comparator 111 puts out "1". Also, when $h > h_2$, the comparator puts out "1", and when $h > h_3$, the comparator 113 puts out "1".

The light emitting diodes 108G, 108Y, 108r and 108R have their respective cathodes connected to respective collectors of the transistors 118, 119, 120 and 121 and have their respective anodes connected to the power source 56 through resistances 122, 123, 124 and 125, respectively.

The light emitting diodes 108G to 108R in the present example can display different conditions in different colors. That is to say, the light emitting diode 108G displays a normal condition in green, the diode 108Y displays in yellow the condition in which the contact time is appreciably longer in comparison to a reference time length and in which a caution must be paid, and diodes 108r and 108R shows an abnormal condition in red.

A solenoid 103' for actuating the buzzer 103 is connected to the collector of a switch 126 comprising a transistor connected so as to receive at its base the output from the comparator 112, and it issues alarm or warning sound when the diode 108r emits light.

Figure 9:
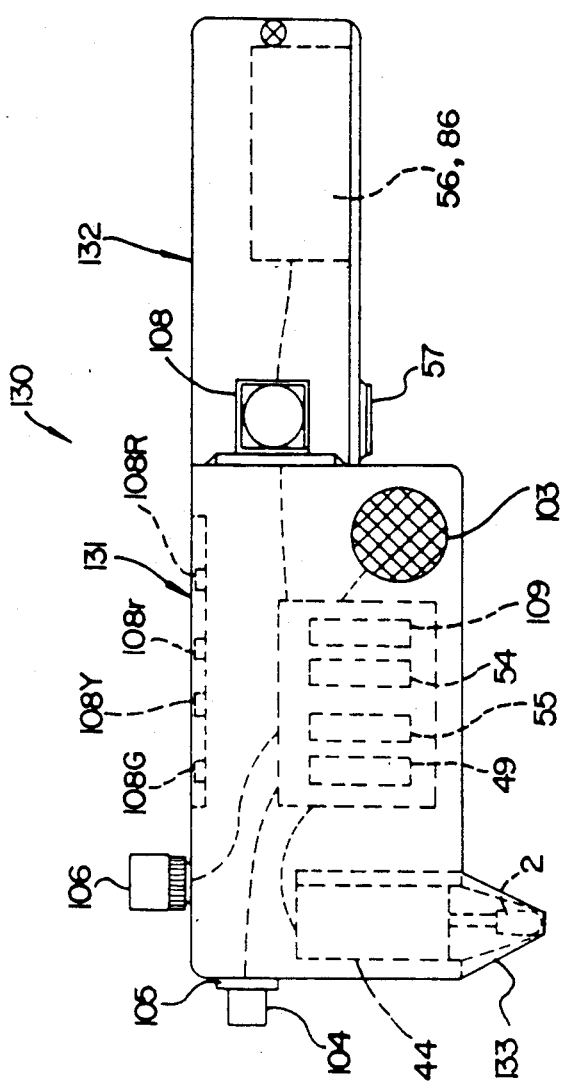
FIG. 9 is a side elevational view of a portable apparatus for impact-type structure inspection, incorporating the hammer driving part shown in FIG. 5.
Figure 8:
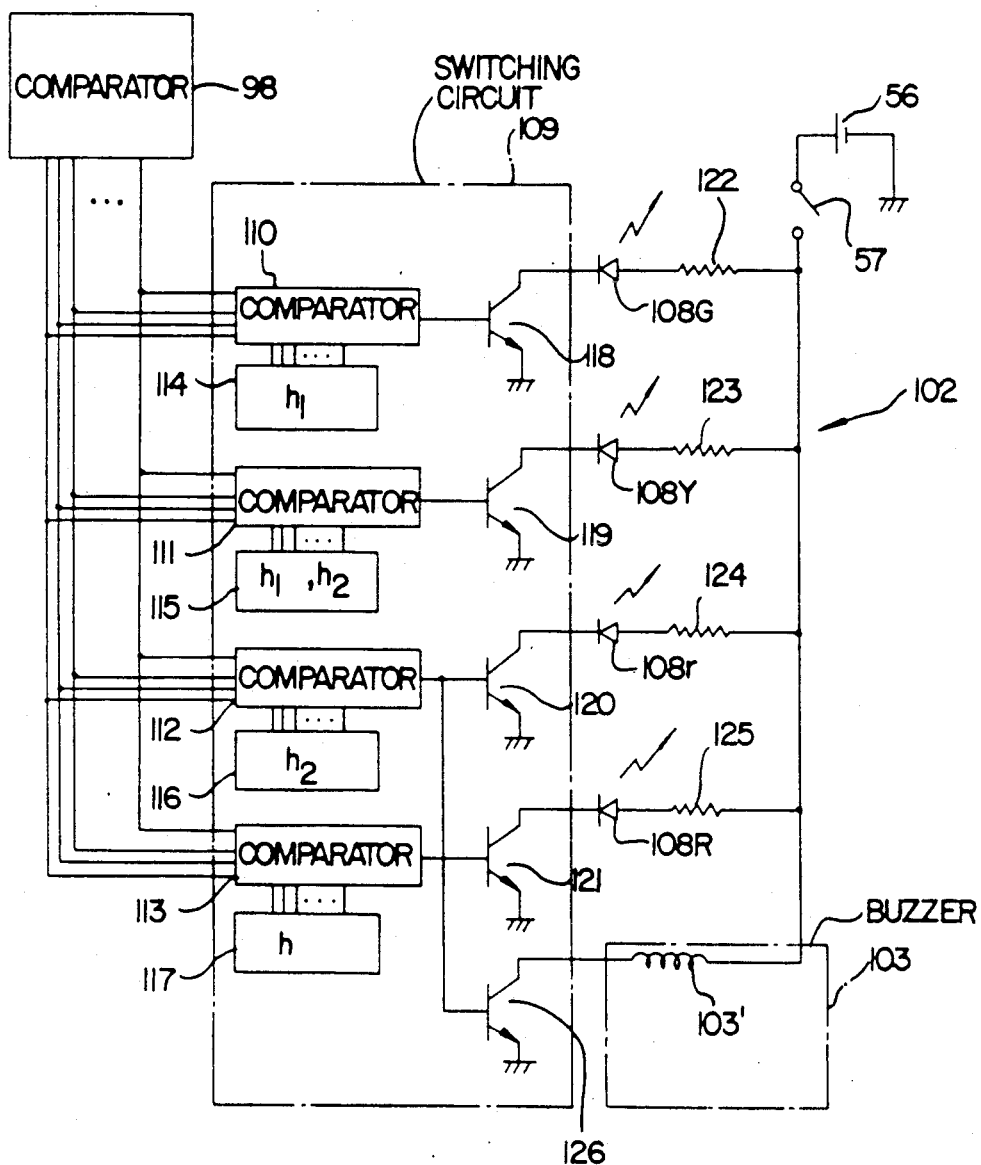
FIG. 8 shows a block diagram of a display circuit in the circuit shown in FIG. 7.

FIG. 9 shows a side elevational view of a portable impact-type structure inspection apparatus, which incorporates the hammer driving part 4, the input circuit 49 and driving circuit 55 therefor shown in FIG. 6, the abnormality judgment circuit 54 for displaying the result of the inspection (FIG. 7), the display device 102 and the buzzer 103 (FIG. 8).

The apparatus shown in FIG. 9 has a configuration facilitating the handling and the operation from the standpoint of the human engineering, and this impact-type inspection apparatus, generally shown at 130, comprises a main body 131 and a handle or grip 132, which are integrally fabricated. The main body 131 is provided with such as the impact strength setting knob 105, the abnormality display level setting knob 104, the average number setting knob 106, light emitting diodes 108G, 108Y, 108r and 108R, and the buzzer 103.

On the other hand, the handle 132 is provided with the reference value setting button 108 at a position facilitating the operation of this button by the thumb of an operator's hand gripping at the handle and the power source switching button 57 at a position facilitating the operation of this button by the forefinger of the same operator's hand as above. Also, at two sides of the hammer 2, legs 133 are integrally provided with the main body 130, which has a triangular configuration tapered in the direction of from its base to its leading end. Further, in the impact-type inspection apparatus 130, such as power source batteries 56 and 86, the hammer driving part 44, the input circuit 49, the driving circuit 55, the abnormality judgment circuit 54 and a switching circuit 109 are housed.

The result of the inspection can be displayed in the above described manner or by any of such other means as letters, numerical figures or symbol marks, a difference in colors, a difference in the length of bars in a bar chart and so forth.

Now, with the reference transferred to the time charts shown in FIGS. 10 and 11, the operation of the impact-type structure inspection apparatus structured as above according to the present example will be described. Hammer drive control:

Initially, the impact-type inspection apparatus 130 is gripped at the handle 132 by a hand and the legs 133 are pressed against an object to be inspected which is not shown. As the power source switch 57 is then pressed in, the apparatus 130 starts operation and the counter 66 counts the pulse signals generated by the oscillator 64 and feeds the calculated value to the comparator 68 (FIG. 6). The comparator 68 compares the calculated value from the counter 66 with a reference value set by the reference value setter 72, and as soon as the calculated value reaches the reference value, puts out pulses as shown in FIG. 10A. The output signals from the comparator 68 are fed to the set terminal $S_1$ of the flip-flop 60 as set signal and the reset terminal $R_2$ of the flip-flop 62 as reset signal, and also to the counter 66 as reset signal. When it receives a reset signal from the comparator 68, the counter 66 clears the calculated value and commence calculation of the output pulses from the oscillator 64 again from 1.

When its set terminal $S_1$ receives the output pulse from the comparator 68, responsive to the rise of that output pulse, the flip-flop 60 puts out "1" (high signal) from its output terminal $Q_1$ (FIG. 10C), which signal "1" is fed to the base of the transistor 78 through the resistor 74 to actuate the transistor 78. Thus, electric current flows from the power source 86 to the striking coil 46, the collector and the emitter of the transistor 78, and as a result of this, the striking coil 46 generates magnetic force and drives the hammer 2 against the object to be inspected.

When the hammer head 36 collides against the object and imparts an impact force thereto, the force detecting sensor 4 comprising a piezoelectric element is compressed by the force of inertia of the weight 38 and the actuation rod 40 and by the reaction force of the object, and during the time between when the hammer head 36 first contacts the object and when it then leaves the object as it is rebounded due to the reaction force of the object, the force detecting sensor 4 puts out a contact detection signal corresponding to the compression force, as shown in FIG. 11A, to the amplifier 50. The amplifier 50 amplifies the signal fed thereto and send an output signal as shown in FIG. 11B to the comparator 52, which compares the output from the amplifier 50 with the reference voltage $V_0$ and puts out a signal of a pulse length corresponding to the length of time of the contact T of the force detecting sensor 4 and the object.

Output signals from the comparator 52 are put into the abnormality judgment circuit 54 and, at the same time, to the reset terminal $R_1$ of the flip-flop 60 in the hammer drive control circuit 56 and the NOT circuit 70. Thus, at the rise b of the signal from the comparator 52, namely at the initiation of contact of the force detecting sensor 4 with the object, the flip-flop 60 is reset, and the output from its output terminal $Q_1$ becomes "0" (low signal), whereby the operation of the transistor 78 stops. As a result of this, the flow of electric current to the striking coil 46 stops, and the before generated magnetic force and the force of driving the hammer 2 disappear.

On the other hand, the flip-flop 62 receives at its set terminal $S_2$ the signals from the comparator 52 through the NOT circuit 70, so that the fall c (FIG. 10B) of the signal from the comparator 52 functioning as set signal, flip-flop 62 puts out "1" from its output terminal $Q_2$ at the fall c or, in other words, as the hammer 2 leaves the object. As a result of this, the transistor 80 is actuated and electric current flows to the return coil 48, which generates magnetic force and returns the hammer 2 away the object.

As soon as the value calculated by the counter 66, which resumed the counting again from 1 as it received the signal from the comparator 68, reaches the reference value, the comparator 68 puts out pulse signals and feed them to the counter 66 as set signal and to the flip-flop 62 as reset signal. Thus, at the rise d (FIG. 10A) of the output signal from the comparator 68, the flip-flop 62 is reset and the output of its output terminal $Q_2$ becomes "0" (shown at e in FIG. 10D), whereby the operation of the transistor 80 stops and the magnetic force generated by the return coil 48 disappears. At the same time as this, the output signal from the comparator 68 is put into the set terminal $S_1$ of the flip-flop 60 and, in same manners as stated above, the flip-flop 60 puts out the "1" signal to the transistor 78 to actuate this transistor 78. As a result of this, electric current flows to the striking coil 46, and the hammer 2 is driven towards the object to be inspected.

When the hammer 2 collides against the object, the force detecting sensor 4 issues the contact detection signal, and at the rise f (FIG. 10B) of the signal from the comparator 52, the output of the flip-flop 60 becomes "0", whereby the operation of the transistor 78 stops and the magnetic force generated by the striking coil 46 disappears. As the hammer head 36 then leaves the object, the output of the comparator 52 undergoes a fall as shown by g (FIG. 10B) and the output of the flip-flop 62 becomes "1", whereby the transistor 80 starts operation and electric current flows to the return coil 48 to cause the hammer 2 to undergo the return motion. The above described cycle of operations is repeated.

As described above, according to the method of hammer drive control of the present example, at the same time as the hammer 2 commences contact with the object, the driving of the hammer 2 is interrupted, so that it can take place that the hammer 2 is repelled or rebounded by the repelling force of the object, and it is therefore possible to correspond the length of time of contact of the hammer 2 with the object for the inspection to the internal structure of the object. Also, the return motion of the hammer 2 can take place at the same time as the hammer 2 leaves the object, it is possible to completely correspond the length of time of the contact together of the hammer 2 and the object to the internal structure of the object.

Now, a description will be given the operation of the abnormality judgment circuit 54.

Initially, the legs 133 of the impact-type inspection apparatus 130 are placed at a reference position, for example a normal portion, of the object to be inspected, and then the hammer 2 is driven as above described. As a result of this, the force detecting sensor 4 detects the contact together of the hammer head 36 and the object and sends a detection signal to the comparator 52 through the amplifier 50. The comparator 52 sends signals of a pulse length corresponding to the length of the time of contact together of the hammer head 36 and the object to the counter 92 of the abnormality judgment circuit 54 (FIG. 7).

At or by the rise of the signal put out from the comparator 52, the counter 92 starts counting the pulses generated by the oscillator 94 and stops the counting at or by the fall of the signal from the comparator 52, undergoes clearing and puts out the counted value. When the reference value setting button 108 provided in the handle 132 is pressed, the controller 96 writes the counted value put out from the counter 92 in the memory 100 and also puts the counted value into the comparator 98 as reference value $T_0$.

The comparator 98 takes in the calculated value (the contact time T) put out by the counter 92, carries out an operation according to the aforementioned equation (6) and puts out the result of the calculation to the display device 102. In the display device 102, when the value above calculated by the comparator 98 is smaller than the predetermined value or 10 as before described with reference to FIG. 8, the light emitting diode 108G is energized in green, showing that the condition is normal at the inspected point of the object. Then, when the hammer 2 is driven to impart an impact force to an abnormal portion of the object, for example a peeled point in a honeycomb board or tiled structure and when the time of contact T of the hammer 2 with the object, the honeycomb board or the tiled structure, is so long that the result of the calculation by the comparator 98 exceeds 10, the light emitting diode 108Y is lit in yellow, showing an abnormal condition in the object. Further, when the result of the calculation is 20 or exceeds this value, the light emitting diode 108r is lit in red and, at the same time, the buzzer 103 issues sound alarm, and if it is 50 or exceeds this, the light emitting diode 108R is also lit in red.

As described above, according to the abnormality judgment method of the present example, it is possible to judge whether or not an abnormal portion exists in the object with reference to or based on the time of contact together of the hammer 2 and the object, and the intended inspection of an abnormality in the object can be made extremely easily and yet accurately in comparison to conventional comparable methods. Also, at the point or portion of an object for inspection at which it includes a core member or the like inside, the object has a higher spring constant and the time of contact of the hammer 2 with the object becomes shorter at such point or portion than at other points or portions of the object, and by making use of this fact, it is possible to inspect whether or not the object includes an internal core or the like.

Further, the levels of the abnormality judgment, namely the values $h_1$, $h_2$ and $h_3$, can be appropriately adjusted at will by turning the abnormality display level setting knob 104. For example, by turning the knob 104, setting may be made as $h_1=10$, $h_2=20$ and $h_3=50$. Then, the controller 96 reads those set values, writes them in the judgment value setter 114, 115, 116 and 117, and controls the display device 102 to operate corresponding displays.

The time of contact T of the hammer 2 with the object being inspected depends on the spring constant (rigidity) of the object as shown by the aforementioned equation (5) and as the spring contant is larger, the contact time T is shorter. Where the spring constant of the object is very large, the contact time T is very short, and the change $\Delta T$ of the contact time T is so small that it is then difficult to detect an abnormal portion. Therefore, in the cases of objects having a large spring constant, preferably an impact force is applied by hammer 2 of a large mass to increase the $\Delta T$ so much that detection of an abnormality can be facilitated. Also, where the object to be inspected has only a small thickness, the impact force to be imparted to the object may be small, but where the object has a large thickness, in which it is anticipated that an abnormality may exist in a deep point in the object, the impact force is likely to undergo dispersion and/or attenuation, so that it is necessary to apply an intense impact force.

Accordingly, the impact-type inspection apparatus of the present example is provided with the impact strength setting knob 103 so that by adjustably turning this know 103, the intensity of the impact force can be adjusted. By truning the knob 103, the output of the power source 86 changes and the intensity of the magnetic force generated by the striking coil 46 and the return coil 48 can change, whereby the velocity and the force of driving of the hammer 2 can be changed and the intensity of the impact force to be imparted to the object can be changed.

Further, the average number setting knob 106 is for directing the average number at which the counter 92 averages and puts out the plurality of detection signals of the force detecting sensor 4 and also for altering the set value in or of the reference value setter 72 shown in FIG. 6 and altering the distance in which the hammer 2 is driven.

Figure 12:
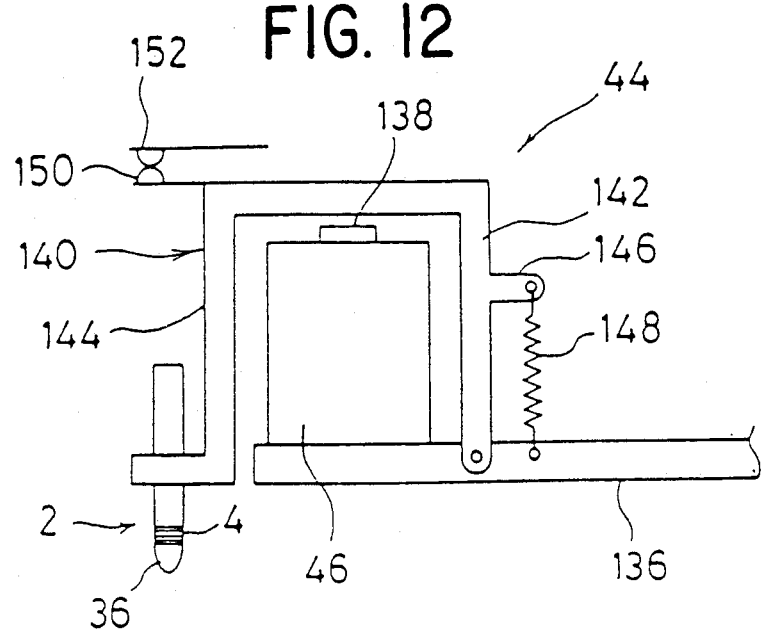
FIG. 12 to FIG. 14 respectively show a sectional view of a hammer driving part.
Figure 13:
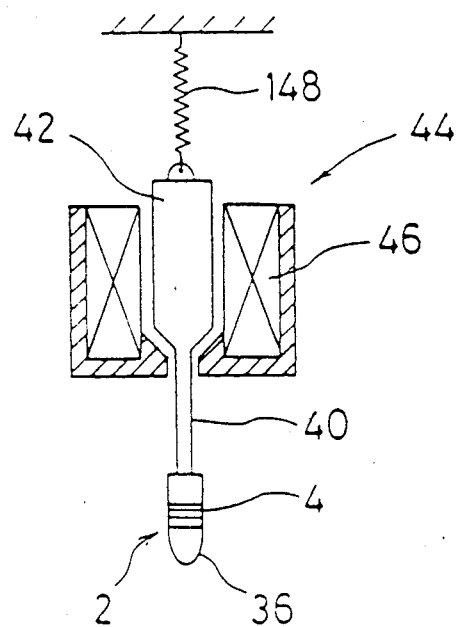
Figure 14:
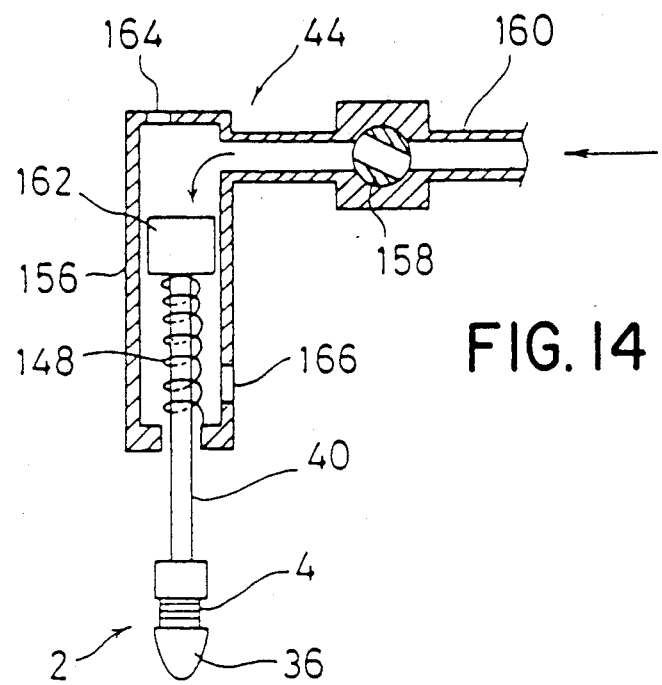

Now, with reference to FIGS. 12 to 14, a description will be entered into a modified embodiment of the hammer driving part.

The hammer driving part 44 illustrated in FIG. 12 includes a base 136, at an end portion of which an electromagnet comprising an iron core 138 and a coil 46 is fixed. The electromagnet is surrounded by a -shaped bracket 140 made of a soft iron, of which one leg 142 is pivotally supported by the base 136, while the other leg 144 is disposed in front of an end of the base 136 with space from this end and has the hammer 2 fixed at its lower end portion. The pivotably supported leg 142 of the bracket 140 is formed with an engaging protuberance 146, and between this protuberance 146 and the base 136, a hammer returning spring 148 is mounted. Also, the bracket 140 has a contact 150 fixed at an upper portion thereof. When the bracket 140 returns to its prescribed return position, the contact 150 undergoes a contact with a fixed contact 152 provided in the impact-type inspection apparatus 130.

In operation of the hammer driving part 44 of FIG. 12 structured as above, when the power source is turned on by the power source switching button 57, electric current flows from the battery 86 to the coil 46 through the electric contacts 152 and 150 and magnetic flux is generated from the iron core 138 to attract the bracket 140, so that the hammer 2 fixed to the bracket 140 is driven towards below to impart an impact force to the object (not shown). When the hanmmer head 36 of the hammer 2 undergoes a contact with the object, a contact detection signal is issued from the force detecting sensor 4, and upon this, the driving circuit 55 shuts off the electric current flowing to the coil 46. As a result of this, the magnetic force generated at the electromagnet disappears and the bracket 140 is rotated in the clockwise direction by the force of the hammer returning spring 148, whereby the hammer 2 leaves the object and the bracket 140 is returned to its prescribed return position. When the bracket 140 reaches its return position, the contact 150 undergoes contact with the fixed contact 152, and electric current again flows to the coil 46 and the hammer 2 is again driven. Then, the above cycle of operation is repeated.

In the present example, too, the driving of the hammer towards the object is brought to halt by the detection signal from the force detecting sensor 4. Therefore, the hammer 2 can receive a reaction force corresponding to the spring constant of the object and can be returned to its return position by the hammer returning spring 148. However, the spring constant of the hammer returning spring 148 is constant, so that it is possible to let the time of contact T of the hammer 2 with the object correspond to the internal structure of the object, without the contact time T depending on the spring constant of the object. Also, now that the return motion of the hammer is effected by the hammer returning spring 148, it is possible to simplify for example the control circuit.

The hammer driving part 44 shown in FIG. 13 avoids the need of using the hammer returning coil 50 used in the hammer driving part 44 shown in FIG. 6, and in place thereof, a hammer returning spring 146 is provided to the plunger 42. In the hammer driving part 44 of the present example, electric current is caused to flow to the the transistor 78 by the output signal from the comparator 66 in FIG. 5, whereby the striking coil 46 drives the hammer 2 toward the object. When the hammer 2 collides against the object, as before stated the flow of electric current to the striking coil 46 stops, and the hammer 2 is returned to its return position by the spring 148.

FIG. 14 shows such an example of the hammer driving part 44 in which the hammer 2 is driven using compressed air. As shown, to an upper portion of a cylinder 156 in which the actuation rod 40 is received, one end of a pipe provided with a rotary valve 158 is connected. The pipe 160 is connected to a high pressure tank (not shown) and guides compressed air into the cylinder 156.

At its upper end, the actuation rod 40 is provided with a piston 162, and between this piston 162 and the bottom wall of the cylinder 156, the hammer returning spring 148 is interposed. The top wall and the bottom wall of the cylinder 156 are formed with an exhaust port 164 and an exhaust port 166, respectively.

In the case of the hammer driving part 44 structured as above, the rotary valve 158 is opened by the output signal from the comparator 68 shown in FIG. 6, when compressed air enters the cylinder 156 to lower the piston 162 and drive the hammer 2. Then, the valve 158 is closed by the contact detection signal issued by the force detecting sensor 4, whereby the hammer 2 is returned to its return position by the force of the hammer returning spring 146.

Further, although in the above, descriptions of examples are made with reference to the instance in which the force detecting sensor 4 comprises a piezoelectric element, the force detecting sensor 4 may alternatively comprise any of elements or devices which can detect strain such as piezoresistance elements and strain gauges.

EXAMPLE 3

Now, a description will be given an example 3, in which use is made of the hand operated hammer 2 shown in FIG. 1 and the display is made in terms of a pulse waveform.

Figure 15:
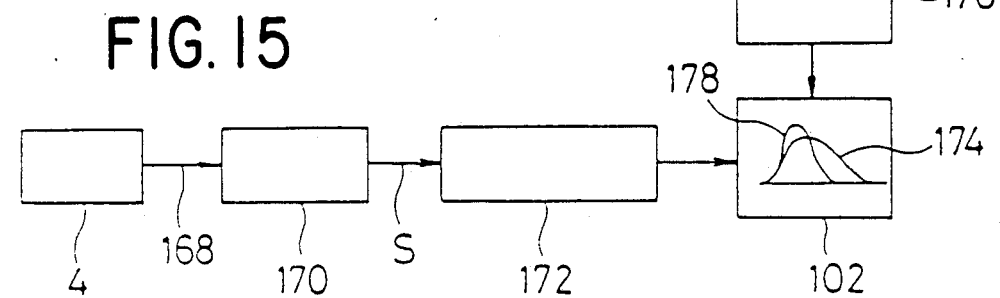
FIG. 15 is a schematic view, taken for an illustration of the processing of detection signals in a third embodiment of the invention in which a manually operated hammer is used and the inspection is made using pulse display means.

In FIG. 15, the acceleration sensor 4 detects the points of the generation and of the termination of a pulse signal waveform when the hammer 2 applies an impact force to the object to be inspected 6, and a change of acceleration with the lapse of time, between the above points of the generation and the termination of the pulse signals, and feeds the results of the detection in the form of an impact pulse signal 168 to an amplifier part 170. The amplified pulse signal S is subjected to an A/D conversion by an A/D converter 172, and the waveform of the converted signal is displayed as a stationary image 174 on the display device or part 102 comprising a cathode ray tube or liquid crystal. Separately, from a reference waveform memory part 176, a reference waveform 178 for comparison (usually the waveform representing a normal condition) is put into the display part 102 and displayed in close proximity to the above stationary image 174. Preferably, the two waveforms are displayed for example in different colors or by differently bold or thick lines so that they can be readily discriminated visually.

As described above, in the present example, the determined waveform is displayed in close proximity to the reference waveform (displayed in a juxtaposition), so that a structural abnormality can be easily told by visually ascertaining the degree of difference between the respective waveforms. Also, when necessary, it is possible to carry out a judgment by comparing the determined waveform with a separately provided manual.

Figure 16:
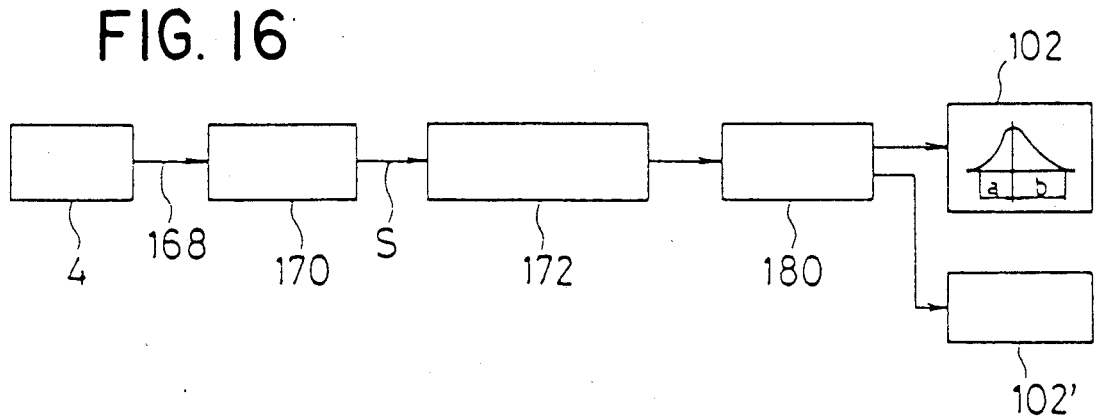
FIG. 16 is a schematic view, taken for an illustration of the processing of detected signals in a modified example of the third embodiment in which a pulse waveform analyzing means is incorporated.

Further, in the case of the modified example shown in FIG. 16 in which an analysis of waveforms is operated, it is possible to feed the impact pulse signal 168 from the sensor 4 to the amplifier part 170, subject the amplified pulse signal S to an A/D conversion through an A/D converter 172, calculate a characteristic value to do with the asymmetry from the converted signal by an operation part 180 which utilizes a micro-computer, and display the calculated characteristic value on a same display part 102 as above or display it in terms of a numerical figure on a display device 102' which makes use of LED. Further, the display may be made by way of changing sounds to be emitted by a sound generating device.

Figure 17A:
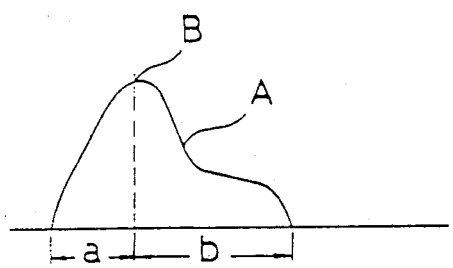
FIG. 17 (a) to FIG. 17 (c) are views, showing various means for displaying waveform characteristic values.

With reference to FIG. 17(*a*) to FIG. 17(*c*), the above calculation of the characteristic value of asymmtry or symmetry made by the operation or calculation part 180 may be carried out by any of the following methods.

Figure 17B:
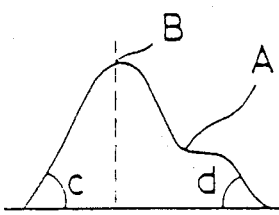
Figure 17C:
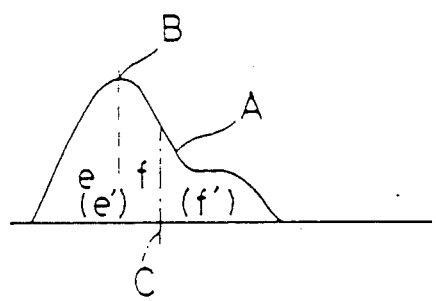

(1) To calculate the ratio to one another of a length a and a length b respectively before and after a peak value B in a pulse waveform is reached [FIG. 17(*a*)];

(2) To calculate the ratio to one another of an angle of rise c at the time of the generation of the pulse waveform A and an angle of fall d at the termination of the pulse waveform A [FIG. 17(b)];

(3) To calculate the ratio to one another of an area e and an area f respectively before and after the peak value B of the pulse waveform A [FIG. 17(c)]; and (4) To calculate the ratio to one another of an area e' and an area f' respectively before and after the center C in the length of the pulse waveform A [FIG. 17(c)].

Using the characteristic value calculated as above, it is possible to display the result of detection in the form of any of a pattern or picture, a multicolor view and a numerical figure on the display part 102 or 102', and tell a structural abnormality with ease by viewing at the displayed inspection result.

Figure 18:
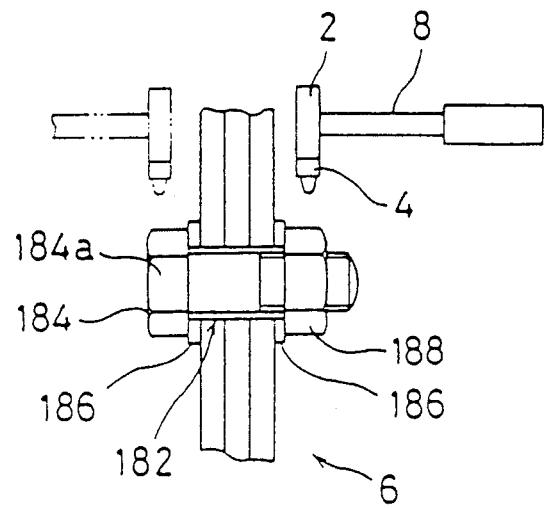
FIG. 18 is a view, showing an instance in which a bolt fastened portion is inspected using the apparatus shown in FIG. 16.

Now, a description will be entered into the result of tests operated using the apparatus shown in FIG. 16. Of a structure assembled by fastening by bolts as shown in FIG. 18, the condition of the fastening was inspected. In FIG. 18, the condition of the fastening was inspected of the portion of a steel-made structure 6 at which a bolt 184 inserted through a bore 182 through the structure 6 is fastened by a nut 188 through a washer 186.

Figure 20:
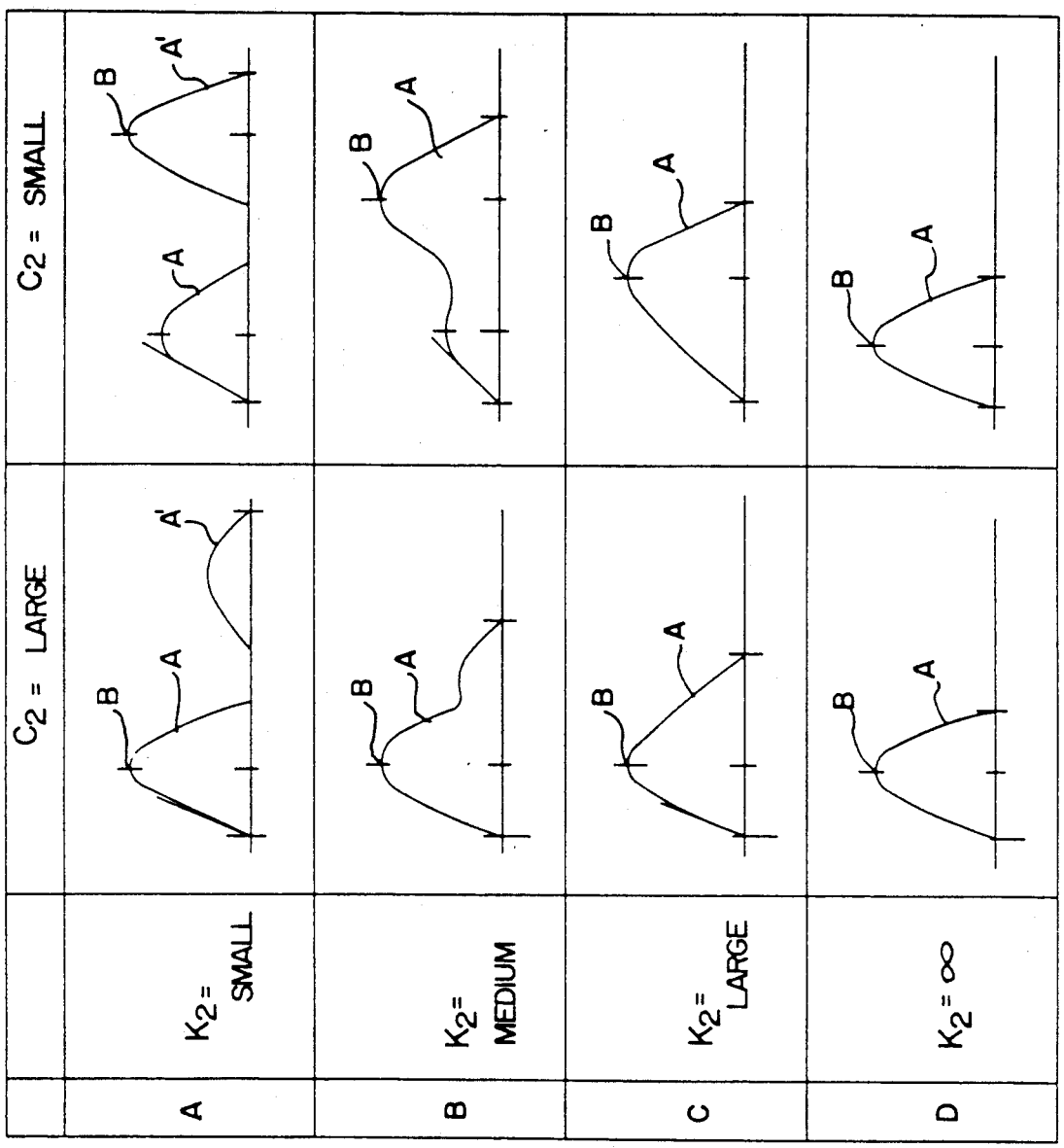
FIG. 20 shows typical waveforms determined in the inspection represented in FIG. 18.

In the present example, by the hammer 2 equipped with the sensor 4 comprising a force detector or an accleration detector using for example a piezoelectric element or a strain gauge, an impact force is applied in the direction of shearing of the nut 188 or the bolt head 184 (in the direction perpendicular to the axis of the bolt 184), and the signals obtained by the sensor 4 were electrically processed to obtain waveforms, which were compared with the various waveforms illustrated in FIG. 20 to determine the condition of the fastening.

Figure 19:
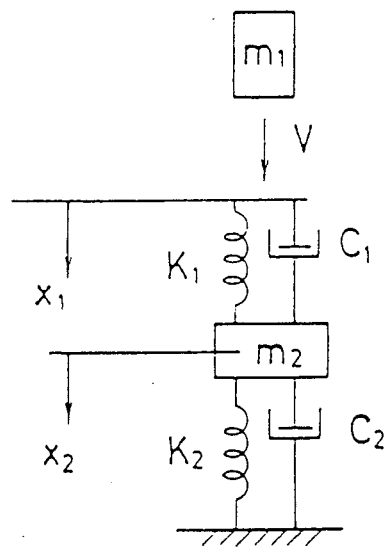
FIG. 19 is a model view, showing the behavior of the structure in the carrying out of the inspection illustrated in FIG. 18.

When hit by the hammer 2, the object being inspected undergoes damped oscillation, so that the model views shown in FIG. 2(a) to FIG. 2(e) are more accurately shown as in FIG. 19, from which it is seen that the spring constant $K_2$, the mass $m_2$ and the damping force $C_2$ in the portion supporting the point of impact application support the spring constant $K_1$ and the damping force $C_1$ at the point being applied with the impact force.

Further, in the model view of FIG. 19, if the spring force $K_2$ in the portion supporting the point being hit is very large or if the mass $m_2$ is very large, this corresponds to the case in which an object of the spring constant $K_1$ is hit by a hammer 2 of the mass $m_1$. Depending on the difference in the values of the spring constant $K_2$ and the damping force $C_2$, the force F acting between the hammer and the point being thereby hit generally takes such eight different waveforms as illustrated in FIG. 20, in which the spring constant $K_2$ are varied and the cases of a large damping force $C_2$ are shown on the left side, while the cases of a small damping force $C_2$ are shown on the right side.

In applying impact force to the bolt head 184a or the nut 188 by the hammer 2, when a sufficient axial tension is generated in the structure, namely when the spring constant $K_2$ in the support portion is $\infty$ as shown in the stage D in FIG. 20, the pulse waveform A then determined takes a form virtually symmetrical with respect to the plane passing through the peak value B regardless whether the damping force $C_2$ at the support point is large or small (the left and the right views on the stage D in FIG. 20), but as the axial tension gradually lowers, changes take place in such as the pulse length and the areas before and after the peak value B is reached as illustrated in the stages C and B in FIG. 20.

It was also found that in a condition in which the bolt is almost completely loosened, there become a plurality of pulses generated as shown in the stage A in FIG. 20. That is to say, the pulse waveform undergoes a gradual change from a symmetrical one to an asymmetrical one.

The view in the stage A in FIG. 20 represents the instance in which the hammer 2 and the object underwent mutual collision two times (occasionally more than two times). This phenomenon occurs when the spring constant $K_2$ in the portion supporting the point being hit is so small that the hammer once leaves but again contacts the support portion of the point being hit.

In practice, the left side view on the stage A in FIG. 20 shows the case in which the damping force $C_2$ is large, and shows that at the first collision, a large pulse was generated, while the second collision produced a small pulse.

In contrast to the above, the right side view on the stage A in FIG. 20 shows the case of a small damping force $C_2$, in which the second pulse is larger than the first pulse. This means that by the first impact of the hammer, the mass $m_2$ moved only lightly, and then the force F increased at the time of the second collision with the velocity reversed.

In the views on the stages B and C in FIG. 20, where the rigidity (=spring constant $K_2$) was relatively great in the portion supporting the point being hit on the object, a two-time collision did not take place, but the position of the peak was moved to an early stage in the cases of the left-side views and to a later stage in the cases of the right-side views for same reasons as above considered in the cases of the stage A views.

The present invention has been made as a result of paying an attention to the above considered changes in the waveform occuring when a structure is subjected to an impact force application, and according to the invention, a change in the symmetry of pulse waveforms due to a change in the rigidity in the portion of the structure supporting the point of the impact force application is detected to determine any abnormality in the structure.

In practice, the objective structures for the inspection are such ones which include a part fastened by for example bolts and honeycomb structures, and typical means for detecting an asymmetry of pulse waveforms is the ratio of the length of the pulse waveform between the point of its generation and its peak value to the length between the peak value and the termination of the pulse waveform.

In one of the inspection methods according to the invention, signals of the pulse waveform detected by a force detecting sensor or an acceleration sensor are subjected to an A/D conversion and then displayed on a cathode ray tube or a liquid crystal display together with a reference waveform such as a waveform at a normal portion in the structure, to carry out a visual examination of a waveform difference. According to another method of the invention, the above signals subjected to the A/D conversion are fed to an operation part, by which a characteristic value concerning the asymmetry of the pulse waveform is calculated, and the characteristic value obtained is displayed on a display device or part to examine the symmetry of the pulse waveform. Alternatively, it can also be made to judge the degree of an abnormality by telling the deviation of the characteristic value from the value obtained at a normal portion of the structure.

The bolt 184 and the nut 188 used in the actually conducted tests were of 22 Mφ and had respective weights as shown in the following Table 1.

TABLE 1 the weight of bolt ≃ about 0.31 kg
the weight of nut ≃ about 0.12 kg
the weight of washer ≃ about 0.043 kg The weight of the hammer 2 was 0.25 kg. Out of a variety of waveforms of the force F acting on the sensor 4 attached to an end portion of the hammer 2, four typical ones are shown in FIG. 21(a) to FIG. 21(d).

The force of fastening in the axial direction of the bolt 184 was varied between 1 to 22.55 tons, but in the drawing figures only the cases of 1, 2, 4.5 and 22.55 tons are shown.

In FIG. 21(a) to FIG. 21(d), the time is taken on the axis of abscissa (unit length: 1 μsec) and the amplitude of the sensor is taken on the axis of ordinate (unit length: 500 kgf).

Figure 21A:
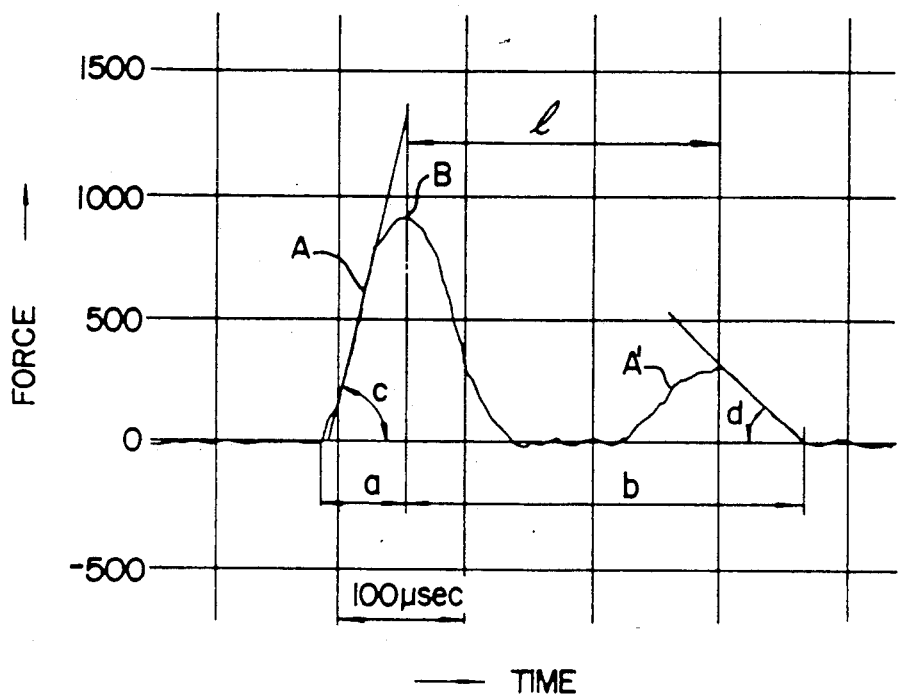
FIG. 21 (a) to FIG. 21 (d) show various waveforms determined in the inspection illustrated in FIG. 18.
Figure 21B:
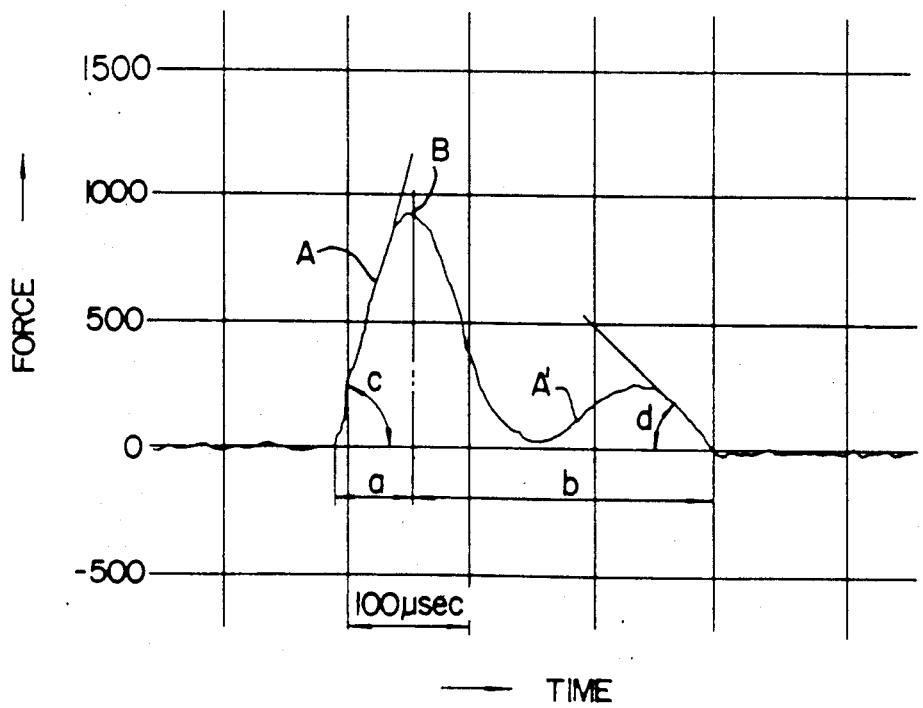

As shown in FIG. 21(a), where the axial tension is 1 ton, there were obtained a large or high pulse A and, with a time lag of 240 μsec, a small or low pulse A'. When the axial tension was 2 tons, as shown in FIG. 21(b) the length between the initiation and the termination of the waveforms A and A' was shortened as to be 180 μsec.

Figure 21C:
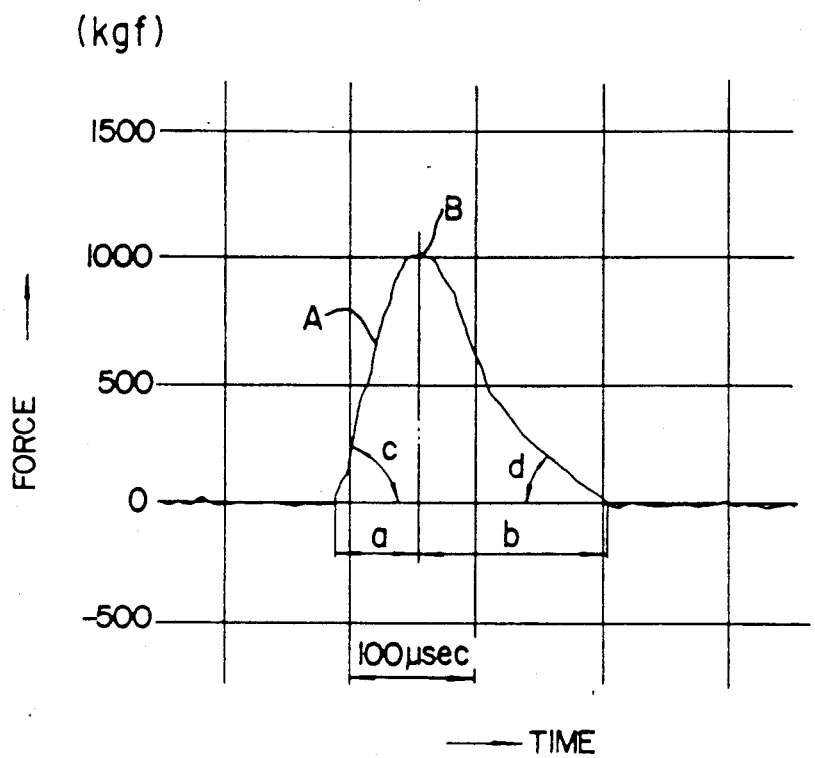

When the axial tension was 4.5 tons, then, as shown in FIG. 21(c) the pulse waveform appeared as the single pulse waveform A, in which the pulse length b after the peak value B is greater than the pulse length a before the peak value B.

Figure 21D:
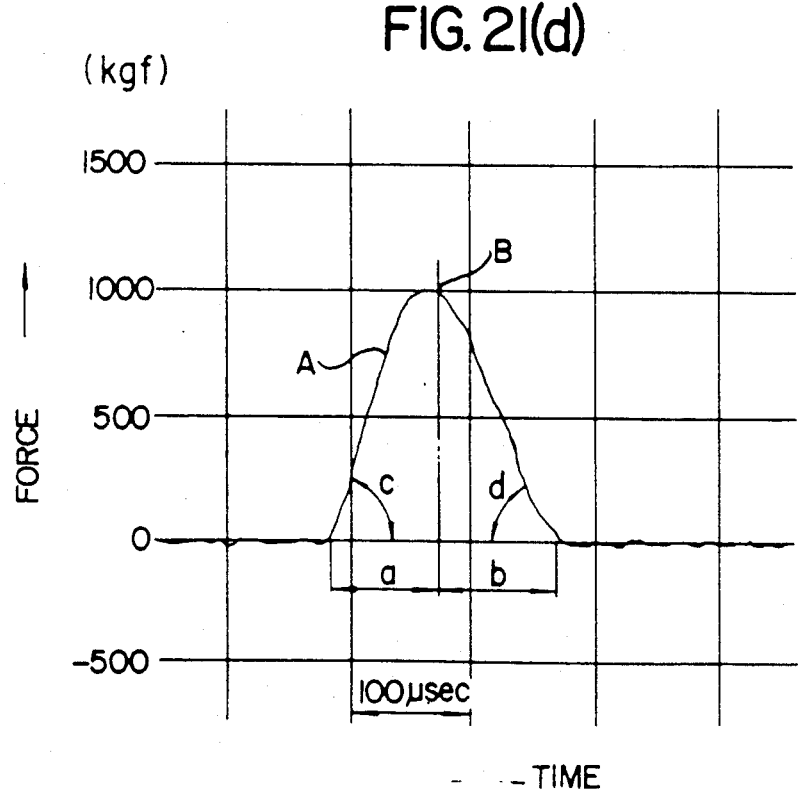

When the axial tension was further increased to 22.55 tons, as shown in FIG. 21(d) the ratio of the pulse length b after the peak value B to the pulse length a before the peak value B, b/a, is nearly 1, and the pulse waveform is symmetrical with respect to the plane passing through the peak value B.

The following Table 2 shows results of determinations of the pulse lengths a and b, and the pulse rise angle c and fall angle d of the above pulse waveforms.

TABLE 2

| axial tension | a | b | c | d | b/a | c/d |
|---|---|---|---|---|---|---|
| 1 | 69 | 309 | 77 | 47 | 4.47 | 1.64 |
| 2 | 64 | 240 | 74 | 43 | 3.75 | 1.72 |
| 4.5 | 68 | 147 | 76 | 40 | 2.13 | 1.90 |
| 22.55 | 85 | 92 | 74 | 69 | 1.08 | 1.07 |

From the above Table 2, it is seen that in the cases of loosening of the bolt shown in FIG. 21(a) to FIG. 21(d), where a normal condition exists, namely where the bolt is in a condition of being fastened at the prescribed value, b/a≃1.0, but that as the degree of loosening of the bolt is greater, this ratio b/a increases.

In actuality, bolts of 22 Mφ or of a diameter close thereto are used in bridges and so forth. According to what has been ascertained by the inventors of the present invention, in the cases of such bolts, the weight of the hammer 2 is preferably 0.1 to 1.0 kg or, more preferably, 0.15 to 0.7 kg in terms of the effective mass of an impact applying body for the impact application, including a force detecting sensor or an acceleration sensor but excluding parts which do not move such as the handle of the hammer 2.

In the cases of honeycomb structures, even if the condition is normal, the pulse waveform is not symmetrical with the peak value as the center of the symmetry as opposed to the cases of bolt fastened structures, and the pulse waveform is asymmetrical such that it is more gently sloping in a first half portion before the peak value in comparison to the remaining latter half portion. When the degree of peeling between the surface plates and the core is greater, the waveform approximates a symmetrical one. This is because although insofar as it is in a normal condition, a honeycomb structure can function as the spring constant $K_2$ and the damping force $C_2$ in the portion supporting the point being hit, as a peeling takes place between a surface plate and the core of the honeycomb structure, the effect of the $K_2$ and $C_2$ becomes lost and the surface plate alone responds to the impact force application.

Tests of a honeycomb structure was conducted, which will now be described.

In a honeycomb composite board having a 10 mm thick honeycomb core of paper and 1 mm thick aluminium plates attached on both surfaces of the honeycomb core, peeled portions of φ 15 mm and φ 25 mm were formed. Then, each of a normal portion H, the φ 15 mm peeled portion I and the φ 25 mm peeled portion J was hit by a hammer of 240 g. Measured values of the impact forces F in the impact tests are shown in the form of pulse waveforms A in FIGS. 22(a), 22(b) and 22(c).

Figure 22A:
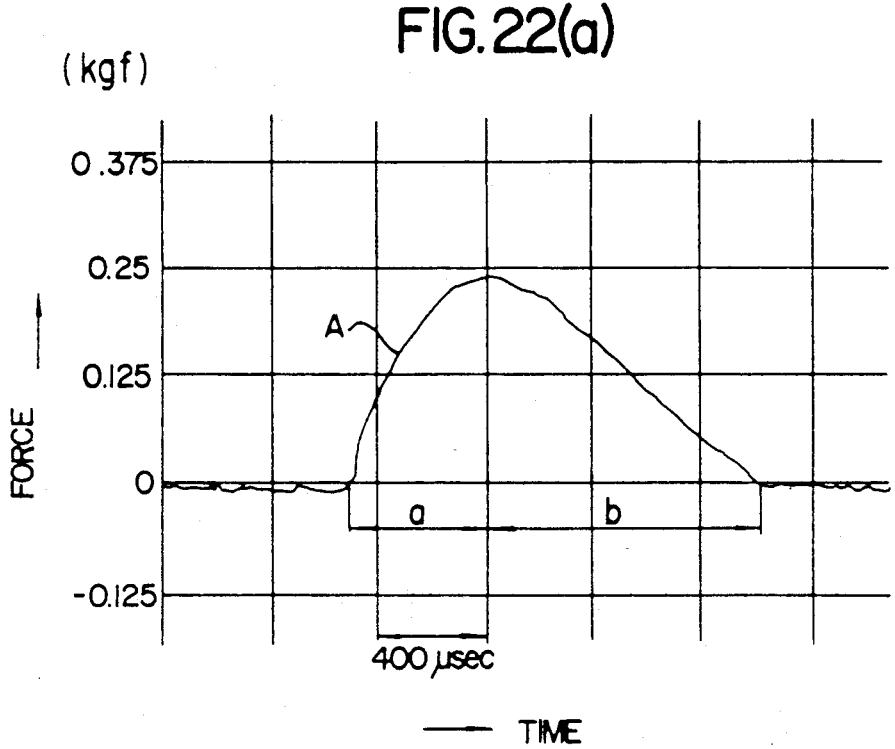
FIG. 22 (a) to FIG. 22 (c) show pulse waveforms determined when a honeycomb structure is inspected using the apparatus represented in FIG. 16.
Figure 22B:
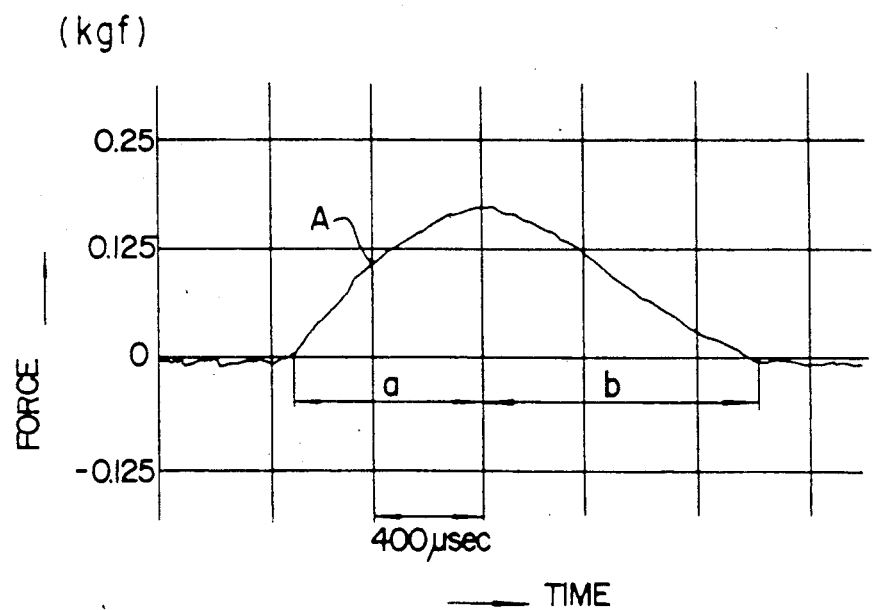
Figure 22C:
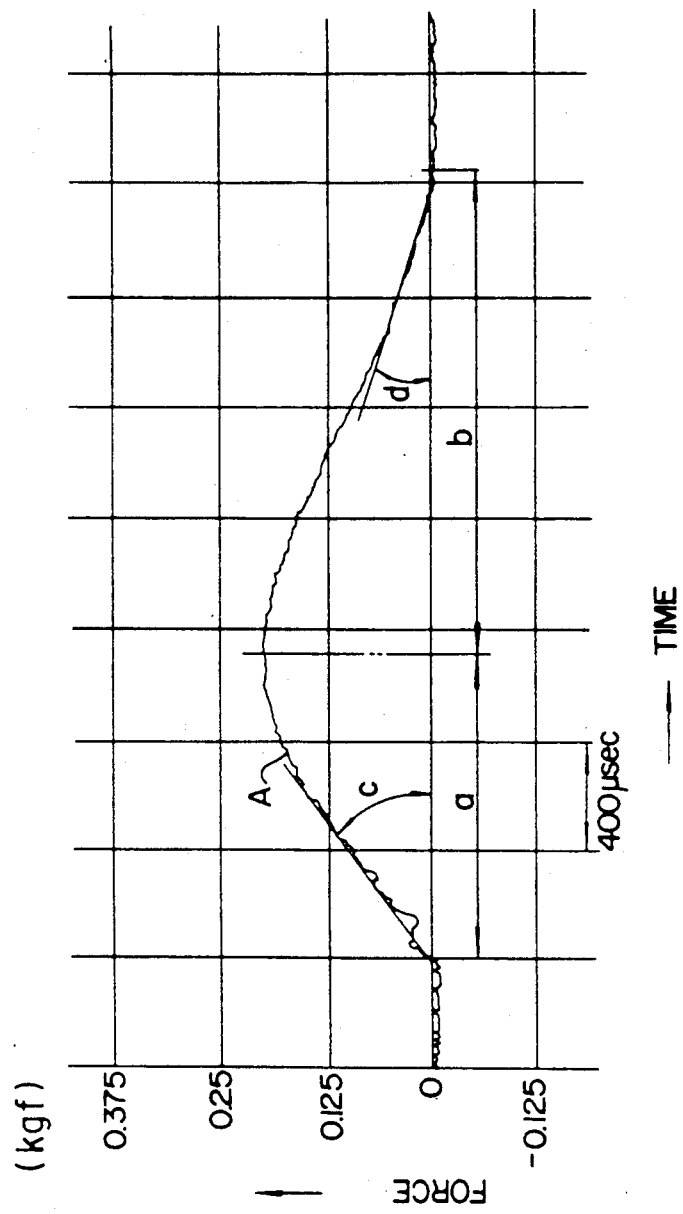

In the pulse waveform A found at the normal portion H, the b/a value was so large as to be 2 as shown in FIG. 22(a), but this value b/a became increasingly smaller in the order of the peeled portion I shown in FIG. 22(b), in which b/a was 1.48, and then the peeled portion J shown in FIG. 22(c), in which b/a was 1.4.

That is to say, in honeycomb structures, the pulse waveform A charges from an asymmetrical one to a symmetrical one as the degree of peeling is greater, so that as in the case of the above described bolt-fastened structure, it is possible to know a structural abnormality by detecting and judging pulse waveforms.

Although the above described examples are limited only to the cases of detection of a loosening of a bolt and a peeling in a honeycomb structure, it will be apparent that the present invention is not limited only to such specific examples. For instance, according to the invention it is also possible to detect the generation of a crack in a support portion in a structure, in which the rigidity in the support portion undergoes a change, so that in same manners as described above, the generation of crack can be detected.

As described in detail above, according to the method of and apparatus for impact-type inspection of structures of the present invention, a hammer is collided against an object to be inspected and a measurement is made of the time between the hammer contacts the object and it is then caused to leave the object by the reaction force of the object, the force acting on the hammer and the object, or the acceleration of the hammer, and by this, it is possible to bring about various advantages, such as follows: (1) It is possible to detect an abnormal portion in the object visually by comparing the result of detection with the prescribed reference or criterion as opposed to the prior art technique relied on an inspector's acoustic organ, so that no particular skill is required in operating the inspection: (2) it does not occur that due to an inspector's fatigue after a continuation of the inspection for a long time, judgment tends to be unstable;. (3) the impact force application can be carried out either manually or mechanically, so that the inspection according to the method or using the apparatus of the invention can be applied to a wide range of utility depending on particular purposes of the inspection; (4) the length of time of contact together of a hammer and an object to be inspected, caused by a hitting with the hammer against the object, is so short that by carrying out an automatic and high speed hitting or a parallel hitting operation, it is possible to rationally enhance the speed of the inspection; (5) even if an object to be inspected is at a dangerous location, it is possible to operate the inspection without the need of an inspector coming up to the location of the object for inspection, so that the inspection can be carried out at safety; and (6) the inspection can be worked even in noisy places.

We claim:

1. Apparatus for impact-type inspection of structures, comprising:
   a hammer having a hammer head and a sensing means for sensing impact force or deceleration, said hammer head being disposed at a leading end portion of said hammer;
   a hammer driving member which includes a hammer driving means for driving said hammer from a return position against an object to be inspected so as to apply a non-destructive impact force to the object to be inspected, and said hammer driving member including a return means for driving said hammer back to said return position; and
   means receiving the output of said sensing means for sequentially actuating said hammer driving means, deactuating said hammer driving means when an output signal is received from said sensing means, and calculating a waveform characteristic of said signal.

2. Apparatus as claimed in claim 1, wherein:
   said hammer includes a plunger which has an iron core, said plunger being disposed on a side of said hammer opposite that of said hammer head;
   said hammer driving means comprises a strike coil for driving said plunger toward the object to be inspected;
   said return means comprises a return coil for driving said plunger in a return motion toward said return position; and
   said means receiving the output of said sensing means comprises a hammer drive control means for actuating said strike coil, for deactuating said strike coil when said means receiving the output of said sensing means receives said output signal from said sensing means, and for actuating said return coil to drive said plunger to said return position upon cessation of said output signal from said sensing means; and an abnormality judgment means for calculating a waveform characteristic of said output signal received from said sensing means and for comparing a calculated waveform characteristic with a reference value; and a display means for displaying a result of the comparison by said abnormality judgment means.

3. Apparatus as claimed in claim 2, wherein said hammer drive control means comprises:
   an oscillation circuit which periodically outputs signals for driving said hammer;
   a strike flip-flop circuit which activates said strike coil when said strike flip-flop circuit receives a signal from said oscillation circuit, and which deactivates said strike coil when said strike flip-flop circuit receives a signal from said sensing means; and
   a return flip-flop circuit which activates said return coil upon termination of said output from said sensing means and which deactivates said return coil upon receiving a signal from said oscillation circuit.

4. Apparatus as claimed in claim 2, wherein said abnormality judgment means comprises:
   a circuit for calculating a waveform characteristic which is a time width of the output signal from said sensing means;
   a plurality of comparison circuits; and
   a display circuit for each comparison circuit, for displaying a result of each comparison; said comparison circuits being preset with respective different comparison reference values and each said comparison circuit is adapted to: receive a waveform characteristic signal from an input circuit, compare the received signal with the respective said comparison reference value, and when said waveform characteristic falls within a predetermined range of the respective said comparison reference value, send a predetermined signal to said display circuit.

5. Apparatus as claimed in claim 1, wherein:
   said hammer head is provided on a side of a free end of a rotatably supported bracket comprising a magnetic body;
   said hammer driving means for driving said hammer toward the object to be inspected comprises a strike coil having an iron core;
   said return means comprises a return spring secured at one end to said bracket; and
   said means receiving the output of said sensing means is adapted to actuate said strike coil and, when said means receiving the output of said sensing means receives the output signal from said sensing means, said means receiving the output of said sensing means ceases actuation of said strike coil.

6. Apparatus as claimed in claim 1, wherein:
   said hammer includes a plunger having an iron core, said plunger being disposed at a side of said hammer opposite said hammer head;
   said hammer driving means comprises a strike coil for driving said plunger toward the object to be inspected;
   said return means comprises a return spring secured at one end thereof to said hammer; and
   said means receiving the output of said sensing means is adapted to actuate said strike coil and, when said means receiving the output of said sensing means receives a signal from said sensing means, said means receiving the output of said sensing means ceases actuation of said strike coil.

7. Apparatus as claimed in claim 1, wherein:
   said hammer has a piston disposed at a side of said hammer opposite said hammer head;
   said hammer driving means comprises a cylinder for receiving said piston, and a valve for controlling compressed air for actuating said cylinder;
   said return means comprises a return spring having one end thereof secured to said hammer; and
   said means receiving the output of said sensing means is adapted to open said valve to supply said compressed air to said cylinder to apply pressure from said compressed air to said cylinder so as to drive said hammer toward the object to be inspected, and when said means receiving the output of said sensing means receives the output signal from said sensing means, said means receiving the output of said sensing means causes said valve to close.

8. Apparatus as claimed in claim 1, wherein said hammer driving member has two legs holding said hammer therebetween and having respective leading end portions converging toward each other, and said hammer head is arranged such that a point at which said hammer head strikes the object to be inspected lies on a line connecting the leading ends of said two legs together.

9. Apparatus as claimed in claim 1, wherein said waveform characteristic of said output signal from said sensing means is a ratio of one of an ascending angle and a descending angle of a signal waveform formed by said output signal from said sensing means to the other of said ascending angle and said descending angle of said signal waveform.

* * * * *